(12) United States Patent
Rinehart et al.

(10) Patent No.: US 9,798,907 B2
(45) Date of Patent: Oct. 24, 2017

(54) REGISTER FOR COUNTING AND TRACKING ITEMS IN A BAG

(71) Applicant: DUFL, Inc., Tempe, AZ (US)

(72) Inventors: William H. Rinehart, Paradise Valley, AZ (US); Albert J. McGowan, San Francisco, CA (US); Michael M. Gordon, Phoenix, AZ (US)

(73) Assignee: DUFL, INC., Tempe, AZ (US)

( * ) Notice: Subject to any disclaimer, the term of this patent is extended or adjusted under 35 U.S.C. 154(b) by 88 days.

(21) Appl. No.: 14/634,447

(22) Filed: Feb. 27, 2015

(65) Prior Publication Data

US 2016/0092833 A1 Mar. 31, 2016

Related U.S. Application Data

(63) Continuation of application No. 14/634,369, filed on Feb. 27, 2015, which is a continuation of application
(Continued)

(51) Int. Cl.
| | |
|---|---|
| *G08B 1/08* | (2006.01) |
| *G06K 7/10* | (2006.01) |
| *G06K 19/077* | (2006.01) |
| *G08B 13/14* | (2006.01) |
| *G06Q 50/28* | (2012.01) |
| *G06Q 10/08* | (2012.01) |

(52) U.S. Cl.
CPC .......... *G06K 7/10366* (2013.01); *G06K 7/10* (2013.01); *G06K 19/07758* (2013.01); *G06Q 10/087* (2013.01); *G06Q 10/08* (2013.01); *G06Q 50/28* (2013.01); *G08B 13/1427* (2013.01)

(58) Field of Classification Search
CPC ............... G06K 19/07758; G06K 7/10; G06K 7/10366; G06Q 10/08; G06Q 10/087; G06Q 50/28; G08B 13/1427
USPC ....................................................... 340/539.13
See application file for complete search history.

(56) References Cited

U.S. PATENT DOCUMENTS

| | | | |
|---|---|---|---|
| 5,299,116 A | 3/1994 | Owens et al. | |
| 5,818,336 A | 10/1998 | Varga et al. | |

(Continued)

FOREIGN PATENT DOCUMENTS

| | | |
|---|---|---|
| CA | 2343775 A1 | 3/2000 |
| CN | 103268504 A | 8/2013 |

(Continued)

OTHER PUBLICATIONS

Written Opinion of the International Searching Authority mailed Feb. 24, 2016, for International Patent Application No. PCT/US2015/052678, 26 pages.

(Continued)

*Primary Examiner* — Naomi Small
(74) *Attorney, Agent, or Firm* — Kilpatrick Townsend & Stockton LLP

(57) ABSTRACT

A register for counting and tracking items in a bag comprises a manifest and an RFID reader. The RFID reader is used to query a plurality of RFID tags attached to items contained in the bag. The register creates reports counting and/or identifying changes to items contained in the bag while the bag is routed and/or items in the bag are processed for a customer.

20 Claims, 22 Drawing Sheets

Related U.S. Application Data

No. 14/583,006, filed on Dec. 24, 2014, now Pat. No. 9,177,186.

(60) Provisional application No. 62/056,247, filed on Sep. 26, 2014.

(56) References Cited

U.S. PATENT DOCUMENTS

| | | | |
|---|---|---|---|
| 6,010,239 | A | 1/2000 | Hardgrave et al. |
| 6,433,732 | B1 | 8/2002 | Dutta et al. |
| 7,183,919 | B2 | 2/2007 | Wang |
| 7,281,615 | B2 | 10/2007 | Siwak et al. |
| 7,378,604 | B2 | 5/2008 | Truong |
| 7,394,165 | B2 | 7/2008 | Schiller |
| 7,511,617 | B2 | 3/2009 | Burman et al. |
| 7,757,947 | B2 | 7/2010 | Reznik et al. |
| 8,077,041 | B2 | 12/2011 | Stern et al. |
| 8,164,452 | B2 | 4/2012 | Moses et al. |
| 8,358,199 | B2 | 1/2013 | Nesling |
| 8,485,329 | B1 | 7/2013 | Roy et al. |
| 8,624,934 | B2 | 1/2014 | Paushkina et al. |
| 9,154,486 | B1* | 10/2015 | Saylor .............. E05B 65/52 |
| 2005/0099309 | A1 | 5/2005 | Hum et al. |
| 2006/0087432 | A1 | 4/2006 | Corbett, Jr. |
| 2006/0207850 | A1 | 9/2006 | Lewis |
| 2007/0229272 | A1 | 10/2007 | Cash et al. |
| 2008/0201244 | A1* | 8/2008 | Johnson .............. G06Q 10/087 |
| | | | 705/28 |
| 2008/0204233 | A1 | 8/2008 | Agrawal et al. |
| 2009/0091453 | A1 | 4/2009 | Ishida et al. |
| 2009/0115572 | A1* | 5/2009 | Valbh .............. G06Q 10/00 |
| | | | 340/7.58 |
| 2009/0265248 | A1* | 10/2009 | Walker ............... G06Q 10/08 |
| | | | 705/17 |
| 2009/0322486 | A1 | 12/2009 | Gerstel |
| 2010/0174759 | A1 | 7/2010 | Piccinini et al. |
| 2010/0211418 | A1 | 8/2010 | Mateer |
| 2011/0040655 | A1 | 2/2011 | Hendrickson |
| 2011/0040757 | A1 | 2/2011 | Kossi et al. |
| 2012/0098642 | A1* | 4/2012 | Krawczewicz .. G06K 19/07707 |
| | | | 340/10.1 |
| 2013/0043080 | A1 | 2/2013 | Kritzler |
| 2013/0050019 | A1* | 2/2013 | Mahmoud .............. G06Q 10/08 |
| | | | 342/357.25 |
| 2013/0218589 | A1 | 8/2013 | Lerner |
| 2013/0221898 | A1 | 8/2013 | Frost |
| 2013/0346255 | A1 | 12/2013 | Hayden et al. |
| 2014/0009291 | A1 | 1/2014 | Requist et al. |
| 2014/0057646 | A1 | 2/2014 | Vaananen |
| 2014/0062700 | A1 | 3/2014 | Heine et al. |
| 2014/0157526 | A1 | 6/2014 | Larmo et al. |
| 2015/0106261 | A1* | 4/2015 | Shmulevsky .......... G07F 17/12 |
| | | | 705/40 |

FOREIGN PATENT DOCUMENTS

| | | |
|---|---|---|
| EP | 1110138 B1 | 5/2003 |
| KR | 10-2013-0109563 A | 10/2013 |
| WO | 00/16189 A1 | 3/2000 |

OTHER PUBLICATIONS

Notice of Publication of Application dated Mar. 31, 2016, for U.S. Appl. No. 14/634,369.

Author Unknown "Lugless Luggage Shipping" *Lugless*. Web. Apr. 2015, all pages. <http://www.lugless.com/>.

Author Unknown "Your Closet in the Cloud" *Make Space*. Web. Apr. 2015, all pages. <https://www.makespace.com/>.

Lumb, D. "MakeSpace: When Venture Capitalists Go Startup" *Fast Company*. Web. Mar. 2014, all pages. <http://www.fastcolabs.com/3027695/makespace-when-venture-capitalists-go-startup>.

Menton, J. "Your Closet in the Cloud: Will MakeSpace Be the Amazon of Physical Storage?" *International Business Times*. Web. May 2014. Retrieved Mar. 2015, all pages. <http://www.ibtimes.com/your-closet-cloud-will-makespace-be-amazon-physical-storage-video-1590735>.

Wikipedia "Luggage Free" *Luggage Forward, Inc*. Web. Mar. 2015, all pages. <http://en.wikipedia.org/wiki/Luggage_Free>.

Wikipedia "Luggage Forward" *Luggage Forward, Inc*. Web. Mar. 2015, all pages. <http://en.wikipedia.org/wiki/Luggage_Forward>.

U.S. Non-Final Office Action mailed on Mar. 24, 2015 for U.S. Appl. No. 14/583,006, filed Dec. 24, 2014, all pages.

Non-Final Office Action Mailed Jul. 5, 2016, for U.S. Appl. No. 14/634,369, 6 pages.

International Preliminary Report on Patentability of PCT/US2015/052678 mailed Apr. 6, 2017, all pages.

\* cited by examiner

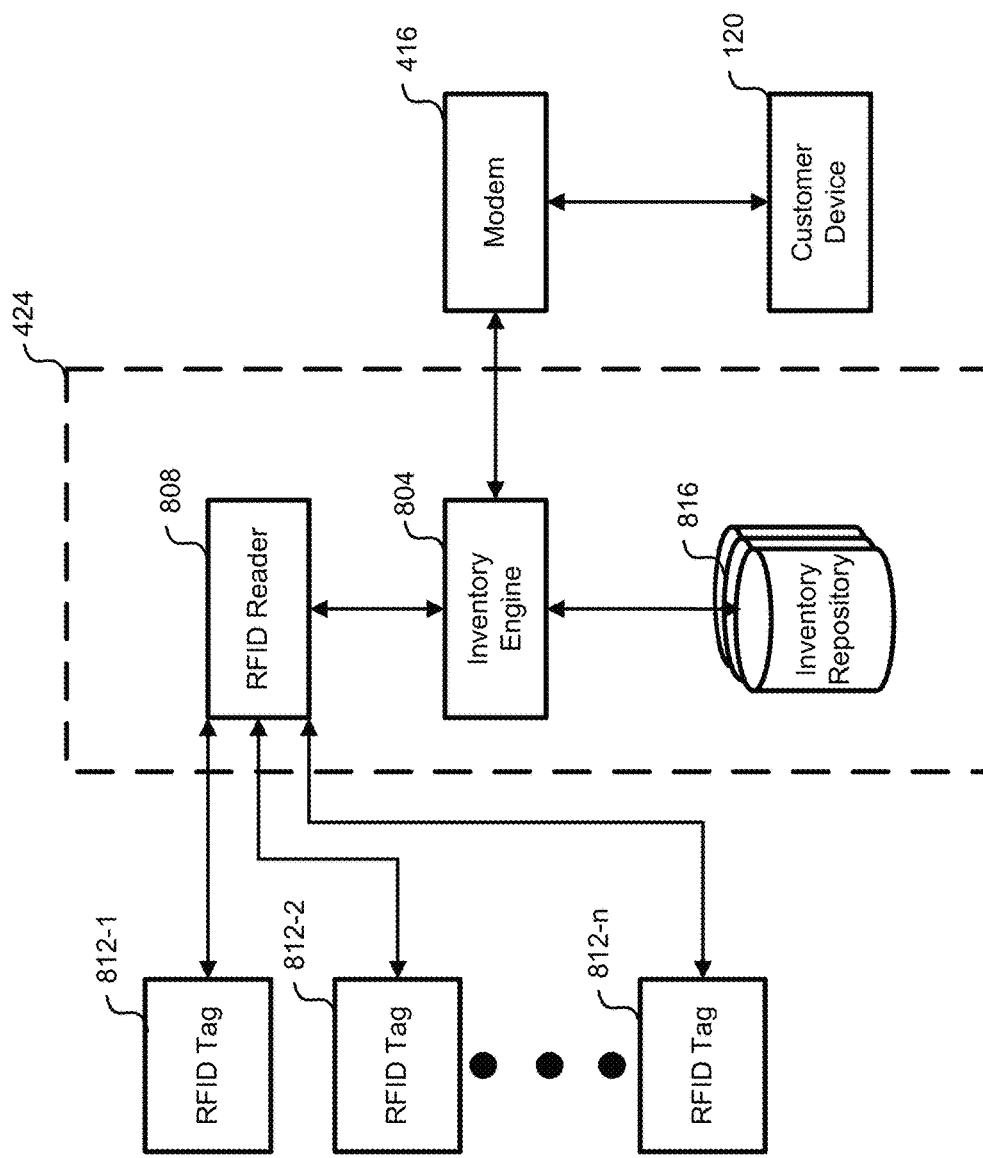

REGISTER FOR COUNTING AND TRACKING ITEMS IN A BAG

CROSS-REFERENCE TO RELATED APPLICATIONS

This application is a continuation of U.S. patent application Ser. No. 14/634,369, filed on Feb. 27, 2015, which application is a continuation of U.S. patent application Ser. No. 14/583,006, filed on Dec. 24, 2014, entitled "REGISTER FOR COUNTING AND TRACKING ITEMS IN A BAG," which application claims priority to U.S. Provisional Patent Application No. 62/056,247, filed on Sep. 26, 2014, the disclosures of which are hereby incorporated by reference in their entirety for all purposes.

BACKGROUND

This disclosure relates in general to registers. Registers are used to record transactions. Some registers include machines and systems for ascertaining a number of movements of various devices. Some registers are used to disclose the numerical extent or quantity of movement of a machine and where the device is separate and independent of the machine whose movements are to be noted; also some machines, such as cash-registers, fare-registers, voting machines, and calculators, have registering or counting devices as elements and have in addition certain other features for a given purpose.

BRIEF SUMMARY

People often use bags (e.g., suitcases) to carry personal items and other items while traveling. In some embodiments, a register is used to count and/or track items of a bag while the bag is routed and items of the bag are processed. For example, a customer selects a plurality of items to put in a suitcase. The customer then sends the suitcase to a processing facility where the plurality of items are logged (e.g., added to a manifest of the suitcase and correlated to the customer) and RFID tags are attached to the plurality of items. For example, an RFID tag (e.g., the size of a grain of rice), is sewn onto a shirt. The suitcase comprises an RFID reader. The customer plans a first trip to a first destination (e.g., New York). The customer requests the suitcase be sent to New York for the customer to have the availability to use the plurality of items while the customer is at the first destination (e.g., for the customer to wear the shirt while the customer is in New York). The suitcase is sent from the processing facility to New York. The customer uses one or more of the plurality of items while the customer is at the first destination. The customer sends the suitcase from the first destination to the processing facility where one or more of the plurality of items are processed (e.g., the shirt is laundered, pressed, and returned to the suitcase). The customer plans a second trip to a second destination (e.g., San Francisco). The customer requests the suitcase be sent to San Francisco for the customer to have the availability to use one or more of the plurality of items while the customer is at the second destination (e.g., for the customer to wear the shirt while the customer is in San Francisco). The suitcase is sent from the processing facility to San Francisco. The customer uses one or more of the plurality of items while the customer is at the second destination (e.g., wears the shirt and a pair of shoes). The customer sends the suitcase from the second destination to the processing facility where one or more of the plurality of items are processed (e.g., the shirt is laundered, pressed, and returned to the suitcase; and the shoes are shined and returned to the suitcase). Thus the processing facility saves the customer time and effort by cleaning and routing the suitcase for the customer (e.g., the customer does not un pack and re-pack the suitcase between trips, and the customer does not take the suitcase through airport security). A register, comprising the RFID reader and the manifest, is used to count and tract the plurality of items of the suitcase.

In some embodiments, a register for counting and tracking items in a bag is disclosed. The register comprises a manifest, an RFID reader, a first report, a second report, and a third report. The manifest comprises a first identification (ID) of a first radio-frequency identification (RFID) tag, wherein the first ID is correlated to an account of a customer, and the first RFID tag is attached to a first item of clothing; and a second ID of a second radio-frequency identification (RFID) tag, wherein the second ID is correlated to the account of the customer, and the second RFID tag is attached to a second item of clothing. The RFID reader is attached to the bag and configured to query the first RFID tag for the first ID; and query the second RFID tag for the second ID. The first report is generated after the bag is sent to a first destination. The first report is generated by identifying a first record, wherein the first comprises the first ID and the second ID from the RFID reader querying the first RFID tag and the second RFID tag; and comparing the first record to the manifest. The second report is generated after the first report. The second report is generated by: identifying a second record, wherein the second record comprises the first ID but not the second ID from the RFID reader querying the first RFID tag but not the second RFID tag; and comparing the second record to the manifest. The second report identifies the second item of clothing is missing from the bag based on the second ID missing from the second report. The third report is generated after the second report. The third report is generated by: identifying a third record, wherein the third record comprises the first ID and the second ID from the RFID reader querying the first RFID tag and the second RFID tag; and comparing the third record to the manifest. In some embodiments, the register comprises a modem for sending the manifest and/or one or more reports from the bag to a computing device (e.g., desktop and/or mobile device) via the Internet. In some embodiments, reports comprise images of items in the bag.

In some embodiments, a method for counting and tracking items in a bag using a register is disclosed. A bag is received from a customer, the bag comprising a first item of clothing and a second item of clothing. A first RFID tag is attached to the first item of clothing, the first RFID tag having a first ID that is unique to the first RFID tag. A second RFID tag is attached to the second item of clothing, the second RFID tag having a second ID that is unique to the second RFID tag. The first ID is correlated with an account of the customer. The second ID is correlated with the account of the customer. A manifest is created for the bag, wherein: the manifest comprises the first ID; the manifest comprises the second ID; and the manifest is correlated to the account of the customer. The bag is sent to a first destination. A first record of the bag is generated using an RFID reader attached to the bag, wherein the first record is generated by the RFID reader querying the first RFID tag and the second RFID tag. A first report is generated by comparing the first record to the manifest. The first report is transmitted to a device of the customer. The first item is removed from the bag. The first item is cleaned and returned to the bag after cleaning. A second record is generated after returning the first item to the bag after cleaning, wherein the second record is generated by the RFID reader querying the first RFID tag and the second RFID tag. The second record is compared to the manifest to generate a second report. In some embodiments, the second record is generated to verify items that were removed from the bag for cleaning were returned. The second report is transmitted to the device of the customer.

In some embodiments, a method for counting and tracking items in a bag using a register is disclosed. A bag received from a customer is identified, the bag comprising a first item of clothing and a second item of clothing. A first RFID tag is identified, wherein the first RFID tag is attached to the first item of clothing, the first RFID tag having a first ID that is unique to the first RFID tag. A second RFID tag is identified, wherein the second RFID tag is attached to the second item of clothing, the second RFID tag having a second ID that is unique to the second RFID tag. The first ID is correlated with an account of the customer. The second ID is correlated with the account of the customer. A manifest for the bag is created, wherein the manifest comprises the first ID; the manifest comprises the second ID; and the manifest is correlated to the account of the customer. A first record of the bag is generated using an RFID reader attached to the bag, wherein the first record is generated by the RFID reader querying the first RFID tag and the second RFID tag. A first report is generated by comparing the first record to the manifest. Instructions are provided to a cleaner for cleaning the first item of clothing. A second record is generated after the first item is returned to the bag after cleaning, wherein the second record is generated by the RFID reader querying the first RFID tag and the second RFID tag. The second record is compared to the manifest to generate a second report. The second report is transmitted to a device of the customer.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

FIG. 9A depicts a block diagram of an embodiment of a real-time, inventory display system for the suitcase.

Figure 1A:
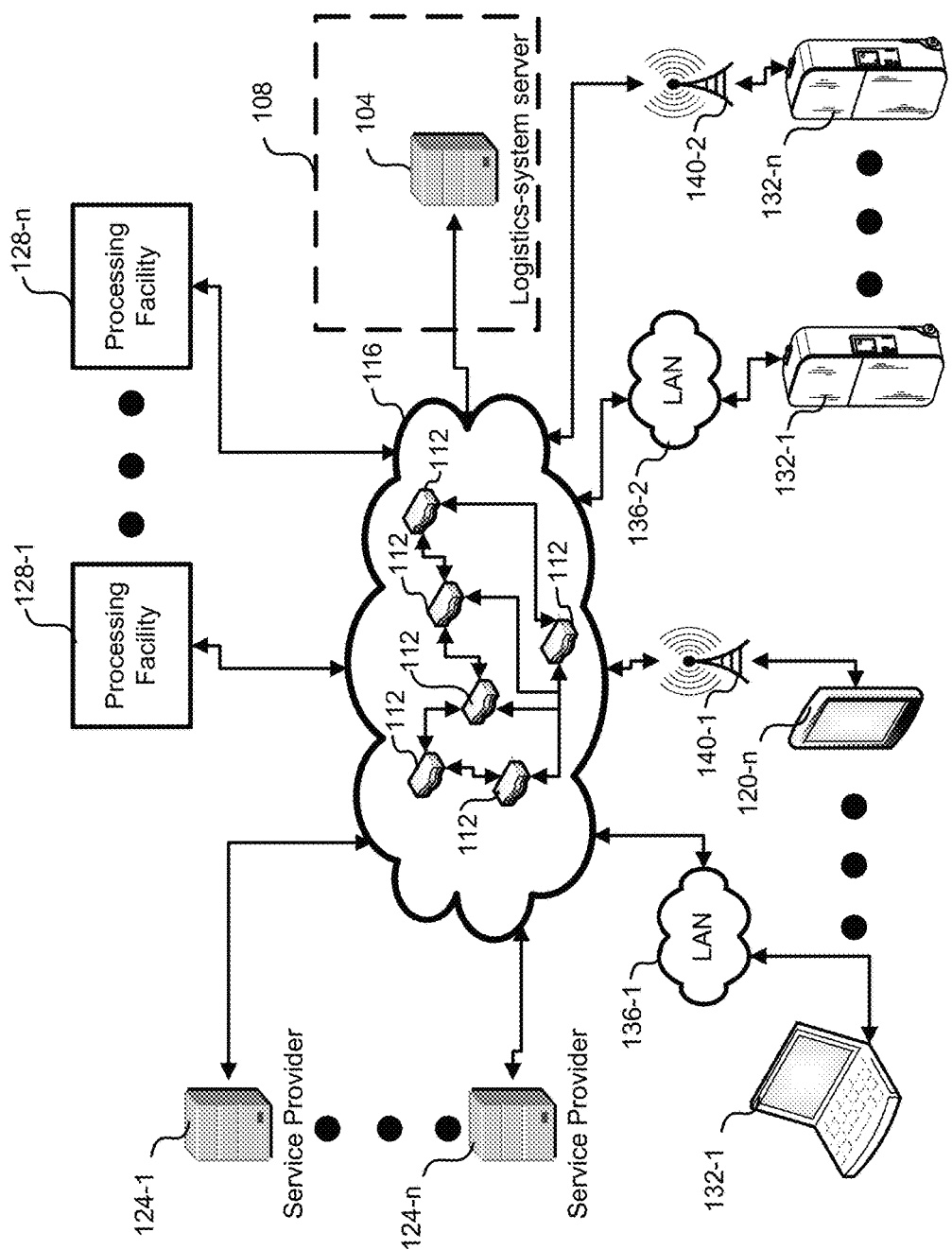
FIG. 1A depicts a block diagram of an embodiment of a logistics system interacting with processing facilities, suitcases, customer devices, and service providers.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Embodiments are generally, and without limitation, related to devices, systems, and methods that allow one or more customers to travel with a benefit of one or more suitcases, personal item(s), and/or other luggage items and content (generally referred to in this application as luggage), but without carrying the luggage and/or otherwise addressing some or all of luggage handling requirements when travelling from one location to one or more other locations (e.g., traveling from a start location a destination). More specifically, but without limitation, a customer provides a suitcase, the suitcase typically comprising contents; the suitcase is stored at a storage location, for example a storage facility (i.e., a location away from the start location); and after the customer identifies, either directly or indirectly, a destination, the suitcase is sent to the destination. In some embodiments, the storage facility not a place where the customer regularly receives mail (e.g., the customer may regularly receive mail at a residence or business). The customer may identify the destination before or during travel from the start location to the destination. In some embodiments, the customer identifies the destination after the suitcase is stored at the storage location and before the customer leaves the start location. In some embodiments, the customer identifies the destination explicitly or identifies the destination indirectly by identifying a travel itinerary, service provider, reservation, and/or other indicator of travel and the like. The suitcase is sent (either directly or indirectly) from the storage location to the destination. The suitcase is returned to the storage location, to another location, or may be delivered to a subsequent destination. In some embodiments, suitcase contents are processed (e.g., cleaned, ironed, polished), replaced and/or replenished before the customer arrives at a destination. In some embodiments, processing, replacing, and/or replenishing suitcase contents saves the customer time and/or provides the customer with a diversity of contents, and/or provides more total contents over a duration of travel.

FIG. 1A depicts a block diagram of an embodiment of a logistics system interacting with processing facilities, suitcases, customer devices, and service providers. Logistic-system servers 104 are part of a logistics system 108. The logistics-system server 104 communicates through routers 112, as part of the Internet 116, with customer devices 120, service providers 124, processing facilities 128, and suitcases 132. The logistics system 108 coordinates delivery and/or processing of one or more suitcases 132. The routers 112 transmit data (e.g., data packets) through the Internet 116 between the logistics-system server 104, customer devices 120, service providers 124, processing facilities 128, and/or suitcases 132. Though only one server shown for the logistics-system server 104, it is to be understood that one or more logistics-system servers 104 could be used. Similarly, throughout this description, if one server is depicted and/or discussed, one or more servers could be used.

The processing facility 128 receives the suitcase 132 and creates a manifest comprising items of a suitcase 132. In some embodiments, an image is taken of each item of a suitcase 132, and images are part of the manifest. The processing facility 128 correlates the manifest and/or the suitcase 132 to an account of a customer. In some embodiments, processing facilities 128 are geographically spread to reduce shipment costs and/or facility costs. A customer uses a customer device 120 (e.g., desktop, laptop, and/or mobile device such as a smart phone) to request delivery of a suitcase 132, receive updates regarding the suitcase 132, and/or to provide instructions regarding the suitcase 132 (e.g., for shirts to be cleaned and/or mended). In some embodiments, a customer device 120 is connected by a local area network (LAN) to the Internet 116 (e.g., a first customer device 120-1 connected to a first LAN 136-1). In some embodiments, a customer device 120 is connected to the Internet 116 by a cell tower 140 (e.g., an nth customer device 120-n connected to a first cell tower 140-1).

Service providers 124 are used for reference (e.g., social media used by a customer to help determine customer likes), processing items of the suitcase 132 (e.g., cleaning), and/or delivery of the suitcase 132 (e.g., a courier service).

In some embodiments, the suitcase 132 communicates with the logistics-system server 104 (e.g., through a modem). The logistics-system server 104 receives information from the suitcase 132 (e.g., GPS data, inventory, etc.), and/or provides instructions to the suitcase 132 (e.g., for the suitcase 132 to display a mailing label on a screen or to unlock). In some embodiments, a suitcase 132 is connected by a LAN 136 to the Internet 116 (e.g., a first suitcase 132-1 connected to a second LAN 136-2). In some embodiments, a suitcase 132 is connected to the Internet 116 by a cell tower 140 (e.g., an nth suitcase 132-n connected to a second cell tower 140-2).

Figure 1B:
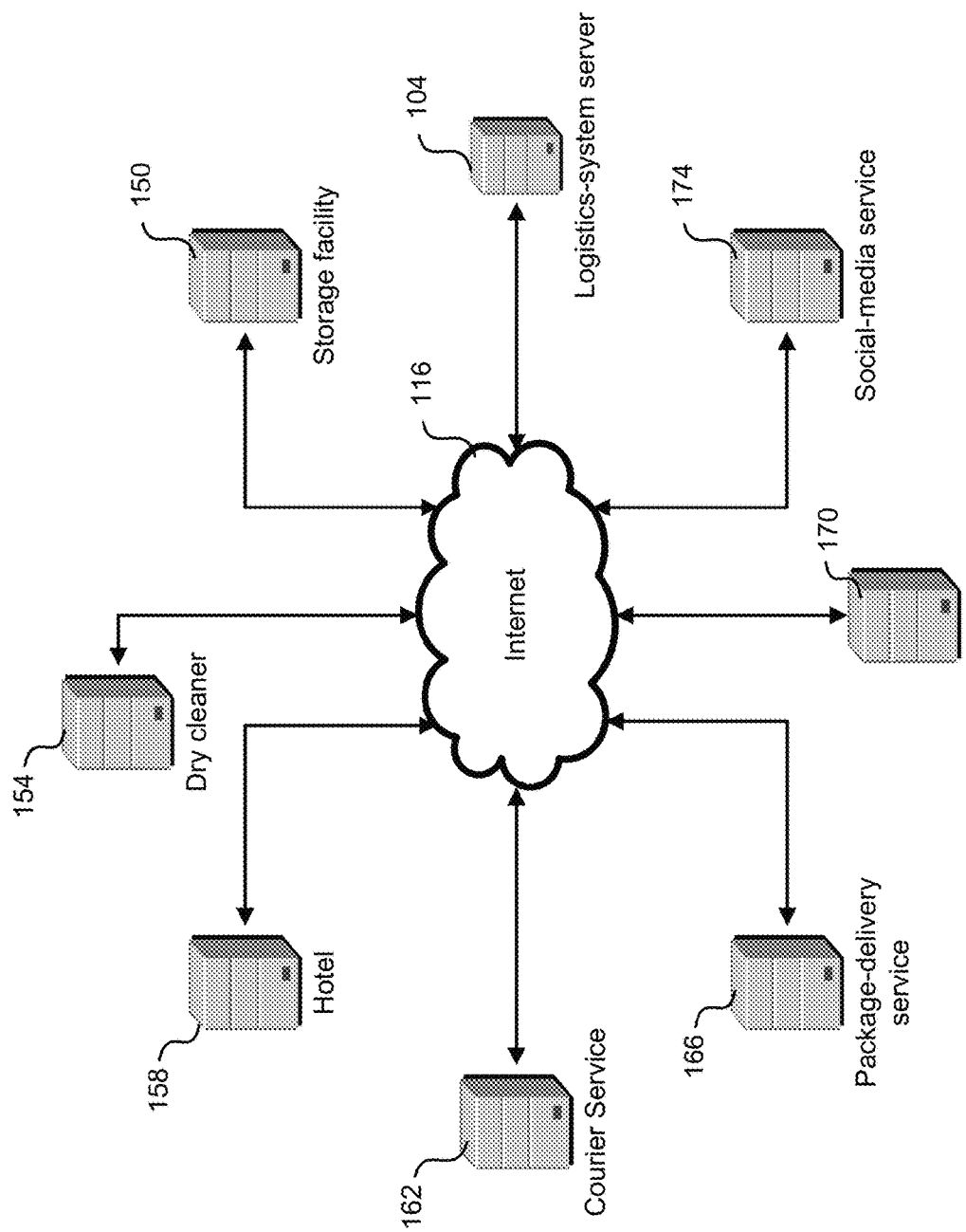
FIG. 1B depicts a block diagram of an embodiment of a logistics system interacting with different service providers.

FIG. 1B depicts a block diagram of an embodiment of a logistics-system server 104 interacting, over the Internet 116, with different service providers 124. Examples of service providers 124 include a storage facility 150, a dry cleaner 154, a hotel 158, a courier service 162, a package-delivery service 166, an airline 170, and a social-media service 174. In this embodiment, the logistics-system server 104 transmits and/or receives data from a server of the storage facility 150, a server of the dry cleaner 154, a server of the hotel 158, a server of the courier service 162, a server of the package-delivery service 166, a server of the airline 170, and/or a server of the social-media service 174. In some embodiments, the logistics system 108 transits data and/or receives data from a service provider 124 without going through a server of the service provider (e.g., transmitting data to a service provider 124 having a computing device [e.g., personal computer, tablet] connected to the Internet 116) because the service provider 124 does not have a server and/or the server of the service provider 124 is bypassed (e.g., a mobile app is provided to the service provider 124).

Figure 2:
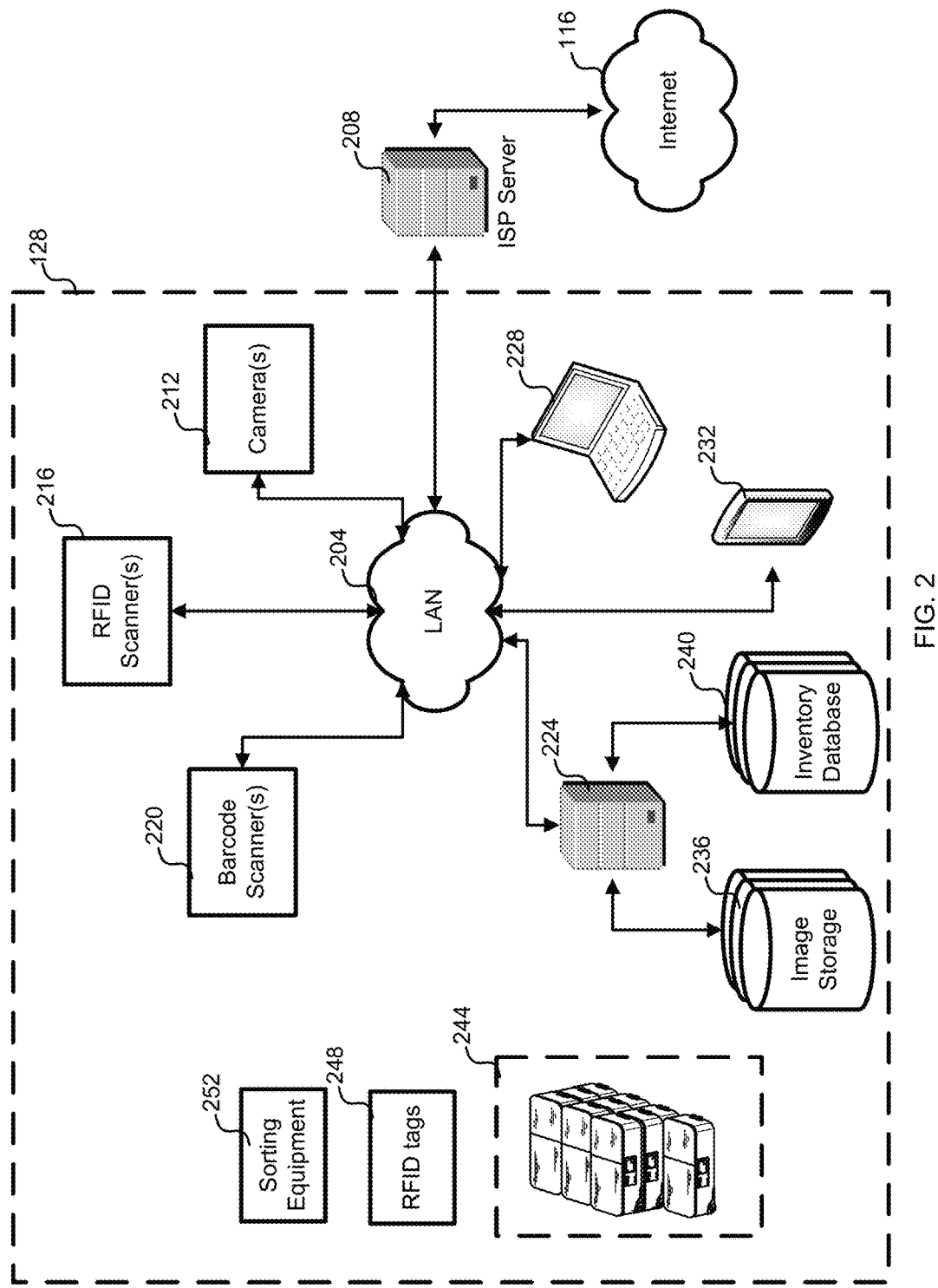
FIG. 2 depicts a block diagram of an embodiment of a processing facility.

FIG. 2 depicts a block diagram of an embodiment of a processing facility 128. The processing facility 128 comprises a local area network (LAN) 204 connected to the Internet 116 through an internet-service provider 208. Connected to the LAN are one or more cameras 212, one or more RFID scanners 216, one or more barcode scanners 220, one or more processing-facility servers 224, one or more web-connected terminals 228, and/or one or more mobile devices 232. The processing-facility server 224 is connected to an image storage 236 and an inventory database 240. The processing facility further comprises storage space 244 for suitcases 132, RFID tags 248, and sorting equipment 252.

A suitcase 132 is received at the processing facility 128. The camera 212 is used to take pictures of items in the suitcase 132 to create a manifest for the suitcase 132. RFID tags 248 and/or barcodes are secured to items in the suitcase 132. The RFID scanner 216 and/or barcode scanner 220 are used to read the RFID tags 248 and/or barcodes. In some embodiments, RFID tags 248 are used instead of barcodes so that multiple RFID tags 248 can be read at once, speeding up an inventory process. Pictures of items of the suitcase 132 are stored in the image storage 236. Manifests are stored in the inventory database 240. In some embodiments, the mobile device 232 is used to perform functions of the camera(s) 212, RFID scanner(s) 216, and/or barcode scanner(s) 220. In some embodiments, the processing facility 128 stores suitcases 132 instead of a storage facility 150 operated by a third party (wherein the processing facility 128 and the logistics system 108 are operated by a common entity). In some embodiments, sorting equipment 252 is used to sort suitcases 132 going to different locations and/or sorting items for different suitcases 132 (e.g., sending and receiving items from multiple suitcases 132 to and from the dry cleaner 154).

Figure 3A:
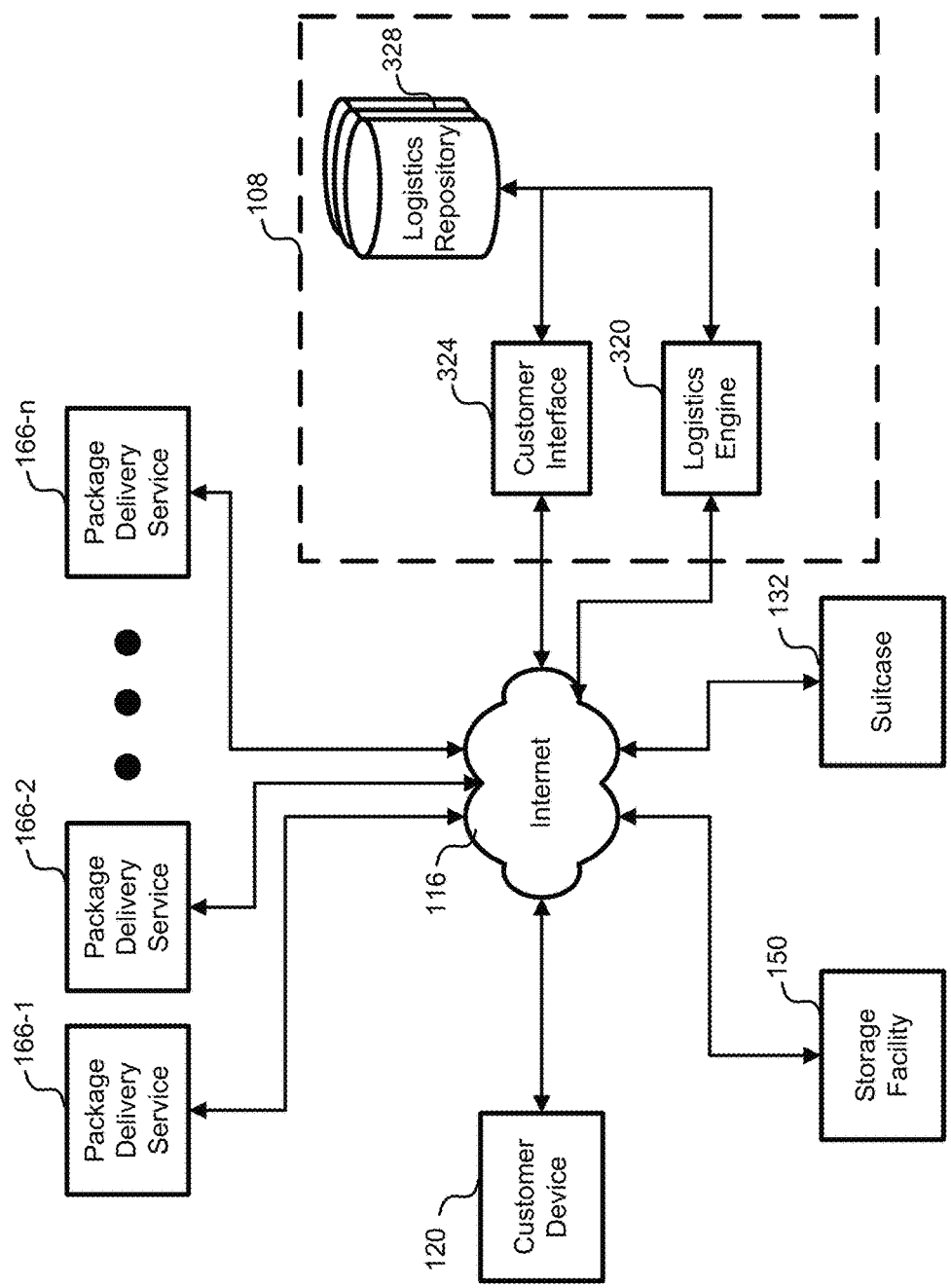
FIG. 3A depicts a block diagram of an embodiment of a system for storage and delivery of the suitcase from a storage facility.

Referring next to FIG. 3A, a block diagram of an embodiment of a system for storage and delivery of the suitcase 132 from a storage facility is shown. In FIG. 3A, a logistics system 108, a customer device 120, a storage facility 150, a plurality of package-delivery services 166, and the suitcase 132 are connected to each other via the Internet 116.

The logistics system 108 comprises a logistics engine 320, a customer interface 324, and a logistics repository 328. The customer device 120 interacts with the logistics system 108 through the customer interface 324. The customer places personal items in the suitcase 132 and the suitcase 132 is sent to the storage facility 150. The storage facility 150 is a location different from the start location of the customer. In some embodiments, the storage facility 150 is a storage facility. Through the customer interface 324, the customer is able to request the suitcase 132 be delivered to a destination. In some embodiments the customer provides a sequence or partial sequence of destinations, an itinerary, a partial destination such as a city but not a specific location within the city, or other destination-related information. In some embodiments the customer changes previously provided destination-related information, and optionally is able to change all previously-provided destination-related information or only some; for example, previously-provided destination-related information that cannot be changed may appear grayed-out or is otherwise indicated to the customer. The logistics engine 320 communicates with the storage facility 150 and one or more package-delivery services 166 to deliver the suitcase 132 from the storage facility 150 to the destination. Information about routing and deliveries is stored in the logistics repository 328.

For example, a customer lives in Tucson, Ariz. and plans a first trip from Tucson to New York City, N.Y., arriving in New York on October 25. The start location for the trip is Tucson, and the destination for the first trip is New York City. The storage facility 150 is a storage facility near Los Angeles, Calif. Before the trip (e.g., in January), the customer receives the suitcase 132 and packs the suitcase 132 with personal items (e.g., clothing and toiletries). The suitcase is then sent to the storage facility near Los Angeles (the storage facility 150) for storage (e.g., in January). In March, the customer decides to go on the first trip from Tucson to New York City. The customer uses an app on a smart phone (an example of the customer device 120) to make a request for delivery of the suitcase 132 to New York City by October 25. The customer provides a hotel and/or a hotel address in New York City. The customer interface 324 receives the request for delivery of the suitcase 132 to New York City. The customer interface 324 transfers the request for delivery of the suitcase 132 to New York City to the logistics engine 320. The logistics engine 320 schedules with FedEx (an example of a package-delivery service 166) pickup of the suitcase 132 from the storage facility on October 20 for delivery to the hotel by the morning of October 25. The logistics engine 320 provides instruction to the storage facility to prepare the suitcase 132 for pickup by FedEx on October 20, and, at that time, or optionally at a later time prior to pick up, communicates label information, such as a label format and parcel number, to the suitcase 132, which displays properly formatted label information on the dynamic display 412. The logistics engine stores information about FedEx picking up the suitcase 132, the hotel information, and instructions to the storage facility in the logistics repository 328.

On October 20, FedEx picks up the suitcase 132 at the storage facility and delivers the suitcase 132 to the hotel the morning of October 25. Because the dynamic display 412 displays the assigned FedEx parcel number in an appropriate FedEx-compatible format, FedEx personnel and systems can handle the suitcase 132 as a standard FedEx package, including scanning the dynamic display 412 in the same manner and with the same equipment that a FedEx label is scanned, updating FedEx's systems with information about a location and/or progress of the suitcase 132 as the suitcase 132 is shipped. A service interface communicates with FedEx systems application programming interfaces, receives updated information about the location and/or progress of the suitcase 132 as updates are available, and in turn updates the logistics system 108, the logistics engine 320, the customer interface 324, and/or the logistics repository 328.

On October 20, the logistics engine 320 notifies the customer interface 324 of FedEx picking up the suitcase 132 and stores the notification in the logistics repository 328. The customer can access information about FedEx picking up the suitcase 132 through the customer interface 324. In some embodiments, the customer interface 324 pushes an alert to the customer device 120 (e.g., as a text message or to show up in a notification center of the smart phone) that the suitcase 132 was picked up by FedEx on October 20. Similarly, the customer can receive a text that the suitcase 132 arrived at the hotel on October 25. On the morning of October 25, the customer boards an airplane at Tucson and flies to New York City. When the customer arrives at the hotel in New York City, a staff member at the hotel gives the customer the suitcase 132 when the customer checks-in at the hotel. In some embodiments, the hotel staff sends the suitcase 132 to the customer's room before the customer checks in (and the customer receives a text that the suitcase 132 is waiting in the customer's room).

On October 15, the customer plans a second trip. The second trip is to San Francisco on November 3. The customer, using the customer device 120, provides information about the second trip to the customer interface 324. When the customer is finished with the first trip to New York City, the customer sends the suitcase 132 back to the storage facility (or in some embodiments, the customer leaves the suitcase in the customer's room or at the front desk of the hotel in New York and the logistics engine 320 instructs the hotel staff to set the suitcase 132 for pick up by a package-delivery service 166 for delivery from New York to the storage facility). The logistics engine 320 schedules clothes in the suitcase to be washed and pressed, and for shoes in the suitcase 132 to be polished (and an alert sent to the customer when the suitcase 132 is ready). The logistics engine 320 further schedules with UPS to deliver the suitcase 132 from the storage facility to a hotel in San Francisco, so that the suitcase 132 is waiting for the customer when the customer arrives in San Francisco on November 3.

Figure 3B:
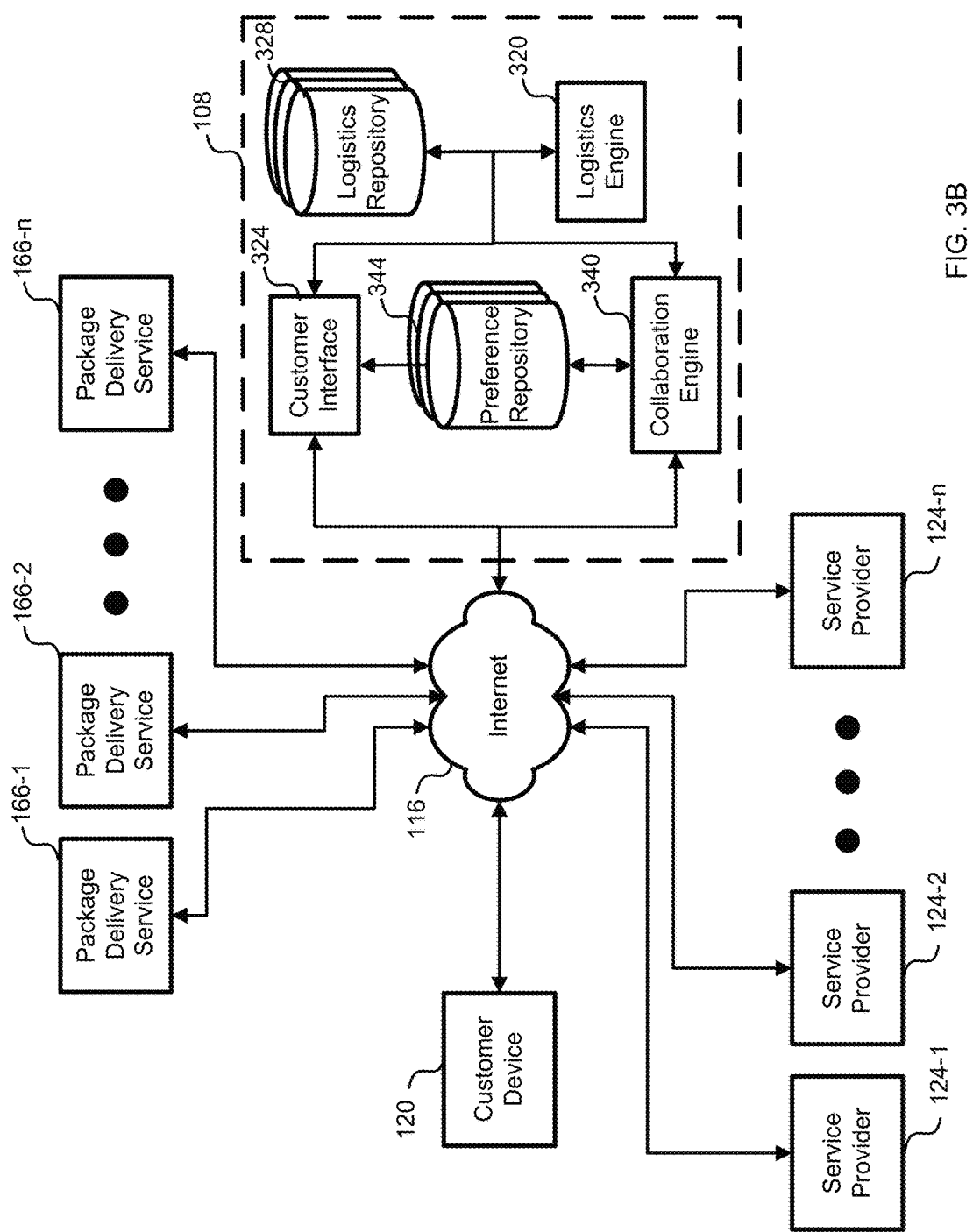
FIG. 3B depicts a block diagram of an embodiment of a system for storage and delivery of the suitcase in collaboration with service providers.

Referring to FIG. 3B, a block diagram of an embodiment of a system for storage and delivery of the suitcase in collaboration with service providers is shown. FIG. 3B is similar to FIG. 3A with the addition of a collaboration engine 340, a preference repository 344, and a plurality of service providers 124. The collaboration engine 340 and the preference repository 344 are part of the logistics system 108.

The collaboration engine 340 works with service providers 124 to provide the customer with assistance when traveling. Some examples of service providers 124 include social media providers, weather websites, travel advisory websites, hotels, and transportation providers (e.g., taxi, bus, and subways). For example, the collaboration engine 340 checks a weather report when the customer is to be in New York City and identifies a more than 50% likelihood of rain. The collaboration engine 340 identifies that an umbrella is not listed on an inventory list of the suitcase 132. The collaboration engine 340 notifies the customer through the customer interface 324, and the customer is given an option to have an umbrella placed in the suitcase 132 while the suitcase is at the storage facility. Or an umbrella is automatically placed in the suitcase 132. Or the hotel staff at the New York Hotel are notified and the hotel staff offer the customer an umbrella.

In some embodiments, the collaboration engine 340 links information from the logistics system 108 to social media accounts. For example, the customer could be notified that certain contacts from a LinkedIn account may also be in New York City during the first trip. The customer may also be given dress recommendations for events the customer is attending in New York City. The inventory list could be shared with friends. Further, preferred accounts (e.g., frequent flyer accounts and preferred guest accounts for hotels) can be consolidated and preferred businesses used.

Figure 3C:
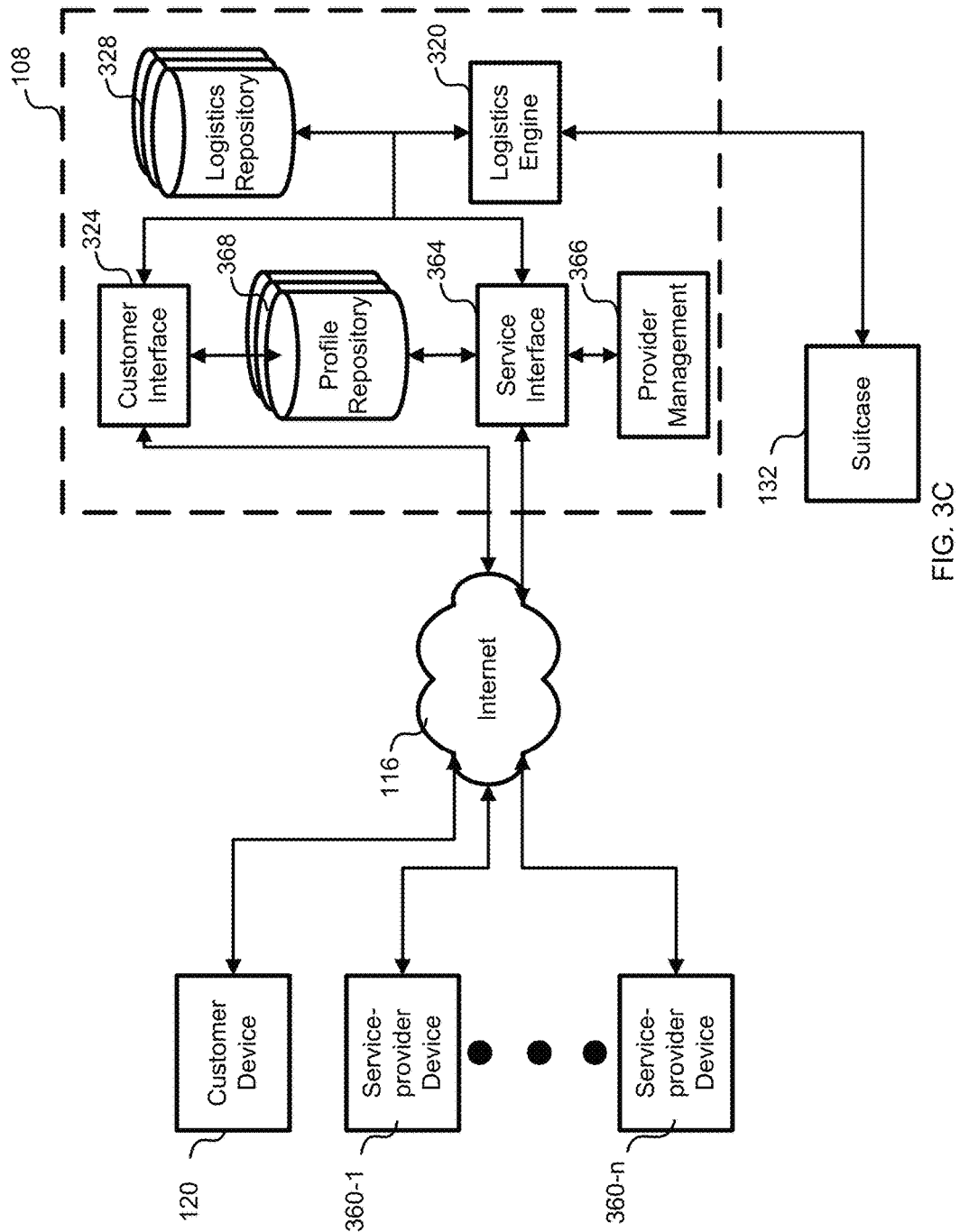
FIG. 3C depicts a block diagram of an embodiment of a system for storage and delivery of the suitcase having multiple interfaces for different users.

Referring next to FIG. 3C, a block diagram of an embodiment of a system for storage and delivery of the suitcase having multiple interfaces for different users is shown. In FIG. 3C, the logistics system 108, the customer device 120, and a plurality of service-provider devices 360 connect to the Internet 116. The logistics system 108 comprises the logistics engine 320, the logistics repository 328, the customer interface 324, a service interface 364, a provider management module 366, and a profile repository 368. The service interface 364 communicates with the service-provider devices 360. The logistics engine 320 is in communication with the suitcase 132 (e.g., through the modem 416, described in reference to FIG. 6). The service interface 364 allows the service-provider device 360 to interact with the suitcase 132.

In some embodiments, information from service-provider devices 360 is accessed through the service interface 364, which accesses available application programming interfaces at and/or through the service-provider devices 360, and communicates the information from the service-provider devices to subsystems of the logistics system 108, such as the logistics engine 320, customer interface 324, and/or logistics repository 328. The service interface 364, as appropriate, enables the logistics system 108, and/or subsystems of the logistics system 108, to monitor and report location information and/or progress information of the suitcase 132; to modify elements of a route of the suitcase 132, if requested and/or if necessary; to communicate to other service-provider devices 360; and/or to manage service providers, as appropriate.

For example, the customer device 120 has one version of a mobile application (i.e., mobile app); a hotel staff member has a second version of the mobile application on an iPad; and a dry cleaner has a third version of the mobile application on an iPad. Profiles of the customer, the hotel staff member, and the dry cleaner are stored in the profile repository 368. The customer, the hotel staff member, and the dry cleaner are each permitted different information and access to the suitcase 132 based on a version of the mobile application and/or a profile. For example, the customer is allowed to select locations to send the suitcase 132 and unlock the suitcase 132. A bellhop is able to scan a 2-D barcode on the screen 470 and determine a room number to place the suitcase 132 in, without necessarily learning an identification of the customer. The bellhop is also able to provide status updates and schedule pick up of the suitcase 132 by a package-delivery service 166. The dry cleaner is able to unlock the suitcase 132 and provide status updates. In some embodiments, requests for action or information are authenticated.

In some embodiments, the service interface 364 also interfaces with service-provider devices 360 to authenticate or otherwise authorize provider personnel. For example, provider personnel may use a smartphone interface to send and receive information to and from the logistics system 108, and/or subsystems of the logistics system 108, such as scanning a suitcase 132 or indicating a location change for a suitcase 132. The provider personnel smartphone interface software may be freely downloadable from a smartphone manufacturer app store or other app store; after downloading the provider personnel smartphone interface software, an employee of, or contractor working for, the service provider can enter credentials of the provider personnel, such as employee number, email address, and/or password into the provider personnel smartphone interface software. The smartphone interface software in turn can authenticate the provider personnel directly (e.g., on a system device of the provider) and/or via the service interface 364. In some embodiments, authentication includes employing federated electronic identity technologies such as OAuth, OpenID, Liberty ID, single sign-on, SAML, and/or another federated electronic identity technology. If the service provider 124 does not have systems supporting federated electronic identity, the provider management module 366 can directly support provider personnel enrollment, verification, credential management (e.g., user ID, password, biometric data, and/or other credentials), and/or user authentication. The provider personnel smartphone interface software may provide support for scanning the dynamic display 412 using a built-in camera or may support identifying, or optionally communicating with, the suitcase 132 using one or more communication protocols, such as NFC, Bluetooth, Wi-Fi Direct, and/or other device-to-device direct communication protocol.

As has been discussed, there are different mobile apps for different functionality and/or users. For example, there is a customer app for the customer, a first service app for a first type of service provider (e.g., for hotel staff), a second service app for a second type of service provider (e.g., for dry cleaners), etc. Thus the customer app could track one or more pieces of luggage belonging to, or associated with, the customer, and the first service app could track multiple pieces of luggage under control of the service provider (e.g., all suitcases in the hotel). But the different apps are all communicating with a single, integrated cloud-based system (e.g., logistics system 108). Furthermore, additional apps can be made for additional functions. For example, in some embodiments, an assistant app is used by an assistant to track one or more boss' suitcase(s). The assistant could work for a first boss and a second boss. The assistant app could link together luggage information for the first boss and the second boss. The assistant, based on permissions granted, could then perform tasks such as track luggage, schedule replacement contents, schedule delivery, etc.

In some embodiments, after the provider personnel smartphone interface software scans the dynamic display 412, and/or otherwise identifies the suitcase 132, the provider personnel smartphone communicates with the service interface 364, which can optionally provide instructions and/or codes to be communicated to the suitcase 132 and/or communicate directly to the modem 416 of the suitcase 132. For example, the dynamic display 412 can be instructed to display different or additional information. Continuing with the example of the Tucson to New York trip, when the suitcase 132 arrives at the hotel in New York, the hotel bellman, who has previously logged into the provider personnel smartphone interface software with the user name and password provided by his employer and been authenticated through the service interface 364 by the hotel's human resources system as an employee of the hotel, can scan the suitcase 132 using the provider personnel smartphone interface software utilizing a camera on the smartphone. The provider personnel smartphone interface software then communicates to the service interface 364, which communicates via the Internet 116 with the hotel's reservation management system to obtain the customer's assigned room number, and then communicates wirelessly, using the Internet 116 and/or cellular network, to the modem 416 of the suitcase 132 and instructs the dynamic display 412 to stop displaying the FedEx label and instead to display the customer's room number. Note that this system also provides enhanced security and privacy for the customer since the hotel bellman never learns personally-identifying information about the customer (e.g., the customer's name, gender, age, etc.).

Though many embodiments have discussed delivery by a parcel service (e.g., to and from a hotel or a residence), many other delivery destinations are possible. For example, the suitcase 132 could be delivered to a restaurant; a business office; a particular office room or conference room of the business office; a bank; a rental car business; a car of the rental car business that is to be rented by the customer; a trunk of the rental car; a train station; an airport; a lounge (e.g., a lounge at an airport); a golf course; a ski resort; and a gym. Many possible delivery destinations are possible and more efficient, in some embodiments, because of the dynamic display 412 and/or the logistics system 108. For example, the customer leaves luggage containing golf clubs at a golf course, and the customer indicates (e.g., by an app on a smart phone or using the dynamic display 412) that the luggage containing golf clubs is to return to a storage location. The indication is received by the logistics system 108. The logistics system 108 transmits a notification to a parcel service to pick up the luggage containing golf clubs with an address of the golf course and updates the screen 470 to reflect a parcel label. In some embodiments, the address of the golf course is selected by the customer, determined by a location of the customer's smartphone at a time that the customer indicates that the luggage containing golf clubs is to return to storage, and/or a GPS receiver of the luggage containing golf clubs.

Further, more than one piece of luggage can be used for a trip, but have different handling/delivery details. For example, the customer could have a first piece of luggage, containing clothes, delivered to a hotel in a city; and a second piece of luggage, containing presentation/demo equipment, to be delivered to a trunk of a rental car in the city. When the customer arrives by air to the city, the customer rents the rental car. The customer then travels in the rental car to an office to give a presentation. After the presentation, the customer goes to the hotel in the city. In this example, the customer does not need to travel with the first piece of luggage to the office to give the presentation.

It is noted that embodiments in FIGS. 3A, 3B, and 3C are not exclusive embodiments, but have been shown and described to provide an understanding of aspects of this invention to a person skilled in the art. Certainly, some embodiments contain all functions and/or features discussed in FIGS. 3A, 3B, and 3C; and some embodiments have less than all functions and/or features discussed in FIGS. 3A, 3B, and 3C, depending on design criteria and desired functionality. Similarly, a person skilled in the art will recognize that many elements disclosed in this application can be combined, omitted, and/or rearranged with other elements depending on design criteria and desired functionality.

Figure 4A:
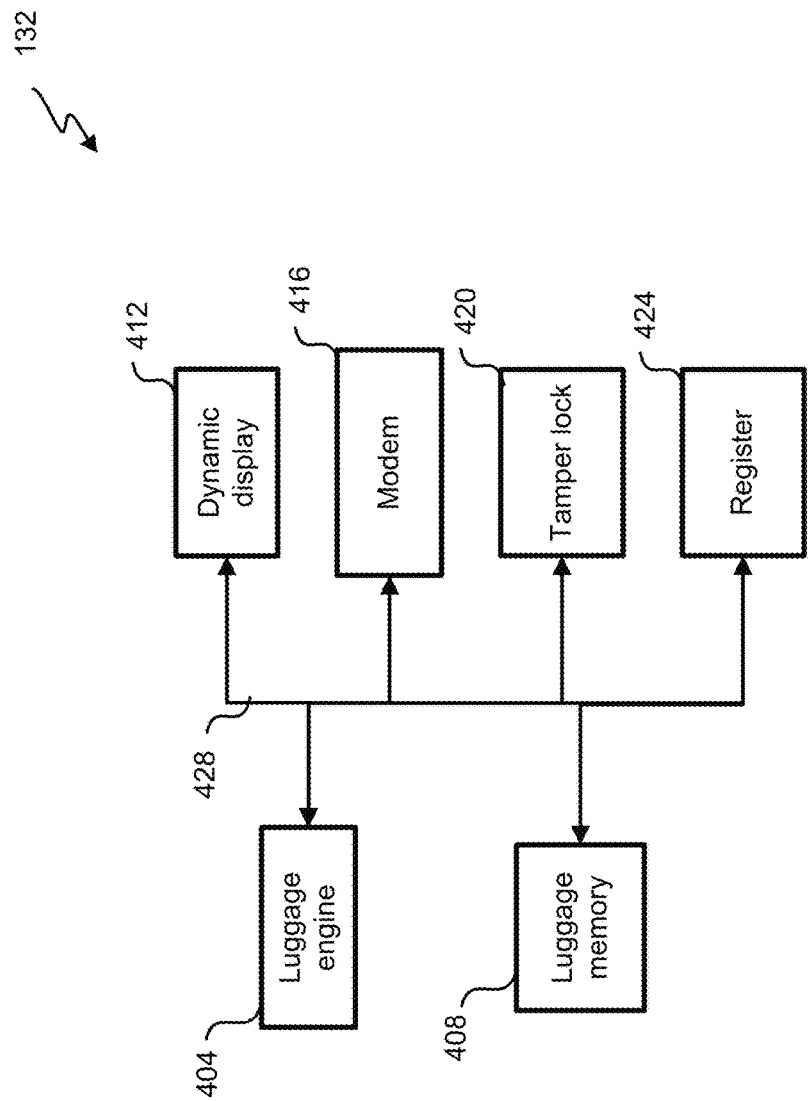
FIGS. 4A and 4B depict simplified diagrams of embodiments of a suitcase for delivery from a storage facility.
Figure 4B:
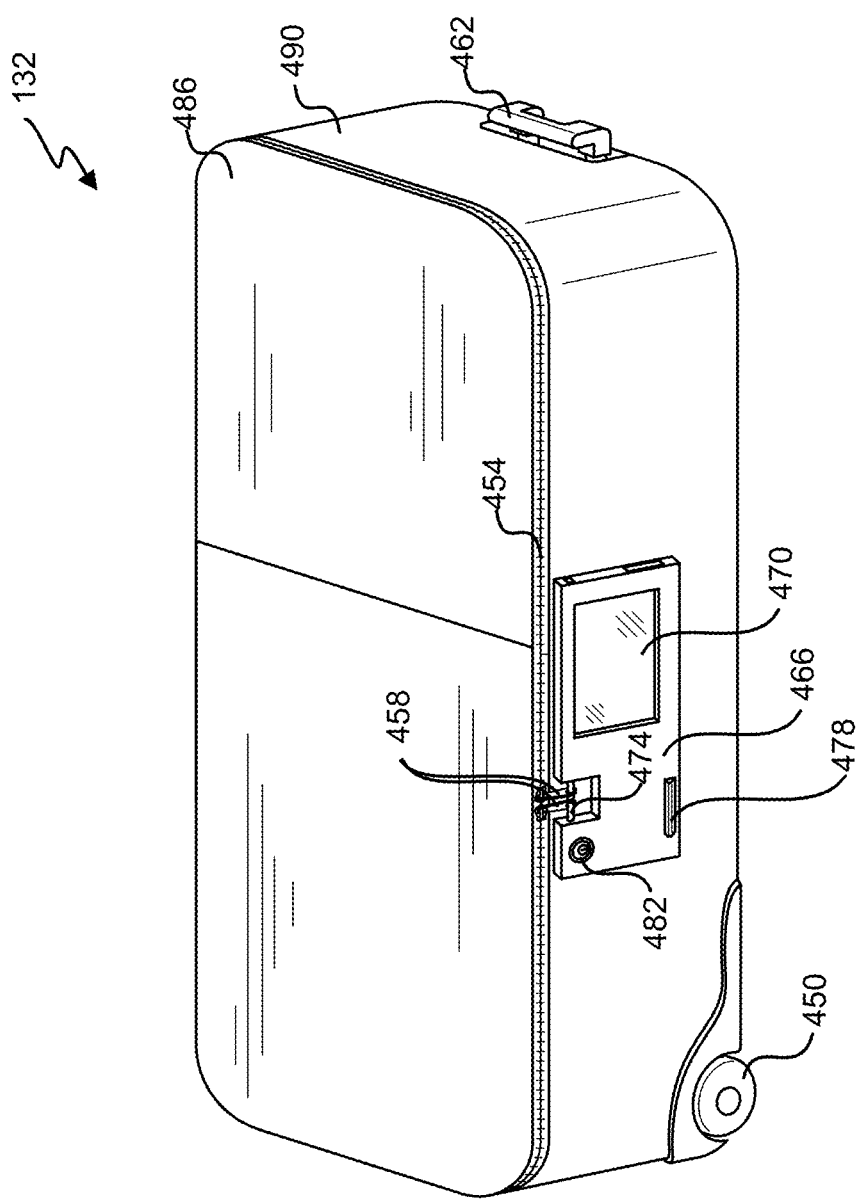

Referring to FIGS. 4A and 4B, simplified diagrams of embodiments of a suitcase 132 for delivery from a storage facility are depicted. In FIG. 4A, a block diagram of an embodiment of a suitcase 132 is shown. The suitcase 132 comprises a luggage engine 404, luggage memory 408, a dynamic display 412, a modem 416, a tamper lock 420, and a register 424. The luggage engine 404, the luggage memory 408, the dynamic display 412, the modem 416, the tamper lock 420, and the register 424 are connected to communicate via a communication bus 428. The luggage engine 404 comprises one or more processors. The luggage memory 408 comprises one or more memory devices. The modem 416 is used to transmit data to and/or receive data from one or more computing devices (e.g., server, desktop computer, laptop, and/or mobile device) In optional aspects of the embodiment, the modem 416 may comprise one or more of: a cellular or non-cellular mobile device; a Wi-Fi or other fixed wireless device; a Bluetooth, near field communication, beacon, or other short-range device; a Global Positioning System device; an audible or inaudible sound-generating and/or sound-receiving device component; an optical device; and/or other component for the purpose of communicating to and/or from people and/or machines.

In FIG. 4B a simplified sketch of an embodiment of the suitcase 132 is shown. The suitcase 132 is basically rectangular in shape and comprises wheels 450, a zipper 454 with two zipper pulls 458, and a handle 462 for pulling the suitcase 132. In some embodiments, the suitcase 132 is sized as a carry on for air travel (e.g., less than 45 linear inches/ 114 linear cm; or less than 22×14×9 inches/56×35×23 cm). In some embodiments, the suitcase 132 is a fold-over suitcase for transporting a suit. Other forms of luggage will be apparent to a person of ordinary skill in the art. In this disclosure, a piece of luggage is considered a bag. A bag is a portable container for carrying items. Though this disclosure discusses suitcases, similar processes can be used for other types of bags. The suitcase 132 further comprises a console 466. The console, in this embodiment, is shown having a screen 470, a locking mechanism 474, and an antenna 478. In some embodiments, the screen 470 is an electronic screen. The console 466 further comprises a processor, which can function as the luggage engine 404, and luggage memory 408. The zipper pulls 458 are secured by the locking mechanism 474 in a position to secure the suitcase 132 in a closed position (e.g., zipper 454 secures a lid 486 to a bin portion 490 of the suitcase 132). In some embodiments, the antenna 478 is internal to the console 466. In some embodiments, the antenna 478 receives a signal to unlock the locking mechanism 474 and an actuator in the console 466 unlocks the locking mechanism 474. The console 466 further comprises a mechanical-access lock 482. In some embodiments, the screen 470 is used to display routing information, such as a parcel label for shipping through a parcel service, instructions for handling and/or processing, and/or instructions for the customer.

Figure 5A:
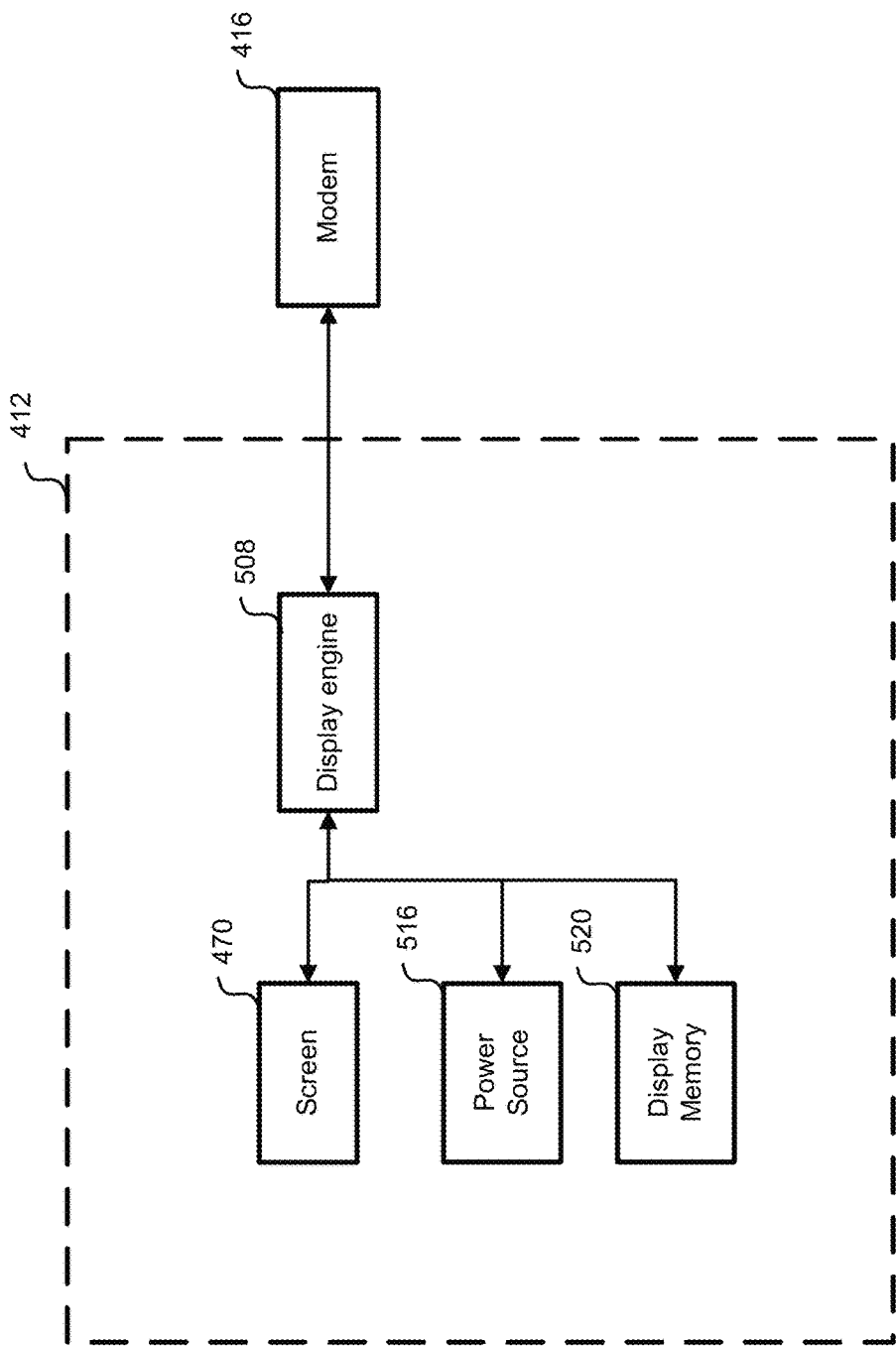
FIGS. 5A, 5B, and 5C depict simplified diagrams of embodiments of a dynamic display used with the suitcase.
Figure 5B:
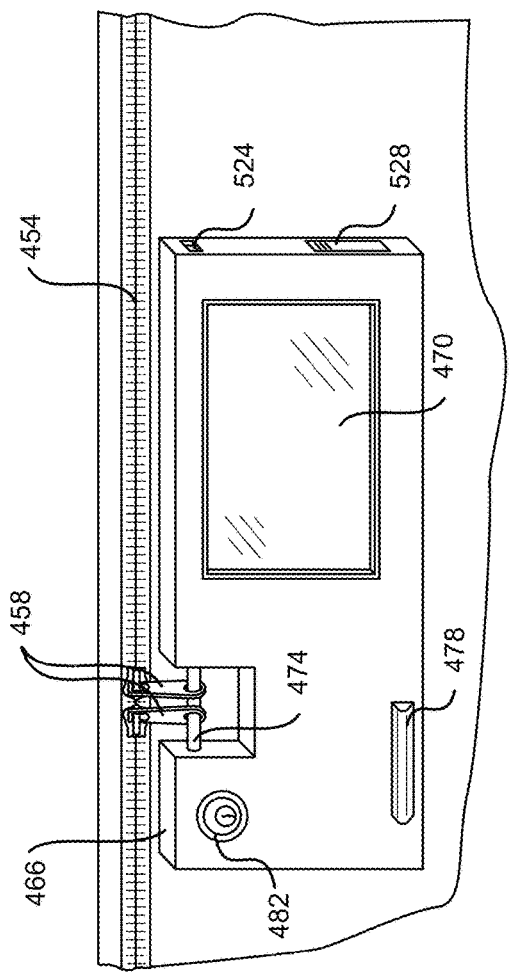
Figure 5C:
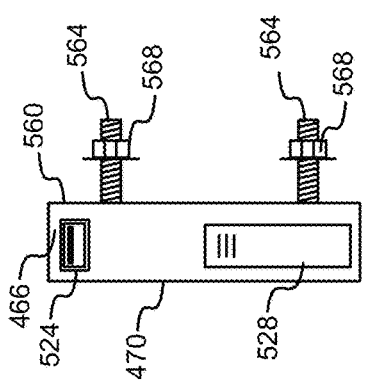

Referring next to FIGS. 5A, 5B, and 5C, simplified diagrams of embodiments of the dynamic display 412 used with the suitcase 132 are shown. In FIG. 5A, A block diagram of the dynamic display 412 is shown. The dynamic display 412 comprises a screen 470, a display engine 508, a power source 516, and display memory 520.

The screen 470 is dynamically updated to enable and/or indicate sequential and/or flexible routing and/or re-routing through a series of route stops, routing and/or re-routing to multiple destinations, routing and/or re-routing to a specific location within an overall location (for example, to a specific hotel room within a hotel at a street address), and/or to communicate other information, in human readable form and/or system readable format. In some embodiments, the screen 470 displays information that serves as a mailing label. For example, the screen 470 is configured to show an address, including street address, city, state, and zip code. In some embodiments, the screen 470 shows a symbol, such as a bar code (1-D or 2-D) or QR code, or displays OCR readable characters or other machine readable information. The screen 470 can display information for a particular package-delivery service, freight transporter, transportation company, courier service, car service, hotel or other travel-related company, for a provider of services related to content of the suitcase, for security services such as the United States Transportation Services Authority, and/or for another party that may transport, monitor, move, open, or otherwise handle the suitcase and/or its content. Some examples of providers of package-delivery services include The United States Postal Service, FedEx, UPS, DHL, and Parcel Pool. Additionally, other common carriers and/or contract carriers provide package-delivery services. Further, the screen 470 can provide instructions for service providers that are not normally in business for package delivery. For example, the screen 470 could provide instructions to a bellhop of a hotel to place the suitcase 132 in the mailroom for a FedEx 10:30 am pickup.

Though many different forms of electronic displays can be used for the screen 470 (e.g., liquid crystal display or light emitting diodes), in some embodiments an electronic-paper display is used to conserve power.

The display engine 508 determines what is displayed on the screen 470. In some embodiments, what is displayed on the screen 470 changes multiple times from a point of origin to a final destination. For example, the display engine 508 causes the screen 470 to display instructions for a bellhop in a hotel to give the suitcase 132 to a courier service. After the courier service picks up the suitcase 132, the display engine 508 causes the screen 470 to display an address of a UPS store nearby. Once the suitcase 132 is at the UPS store, the display engine 508 causes the screen 470 to display a UPS label, which includes a two-dimensional barcode that is read by a UPS barcode reader, to send the suitcase 132 to an address in another city.

In some embodiments, the dynamic display 412 is configured to recover, or re-display, a previously displayed screen and/or label. For example, the suitcase 132 first displays a shipping label for FedEx. FedEx drops off the suitcase 132 at a hotel, and the dynamic display 412 changes to display a room number. But an employee at the hotel realizes the suitcase 132 has been delivered to the wrong hotel. The dynamic display 412 is updated to re-display the shipping label for FedEx, so the suitcase 132 can be picked up and properly delivered using an original parcel number. For example, when the dynamic display 412 changes, the dynamic display 412 could have a button appear on the screen 470 indicating a mistaken delivery, such as "Wrong delivery?". The employee of the hotel presses the button "Wrong delivery?" and the shipping label for FedEx is redisplayed. In some embodiments, an indication of a mistaken delivery is transmitted to a service provider, such as FedEx. For example, the suitcase 132, via the modem 416, sends a message to a logistics system that the suitcase 132 was delivered incorrectly.

In some embodiments, instructions are further provided on the screen 470 if there has been a mistaken delivery, such as "Please place this package outside the door it was left at. A FedEx representative has been notified and will stop by to pick up this package."; or "Please place this package in a safe place and a courier will contact you to retrieve this package. If in doubt of the authenticity of the courier, please ask the courier for a pin number associated with this package. The pin number for this package is: 4798." In some embodiments, the employee at the hotel indicates a mistaken delivery by a mobile app on a smartphone of the employee at the hotel using a scan of the suitcase 132 (e.g., taking a picture of the screen 470) and/or by entering a unique number of the suitcase 132 that is displayed on the screen 470 and/or physically marked on the suitcase 132. The employee at the hotel can also receive instructions by the mobile app for actions to take regarding the mistaken delivery.

In some embodiments, a confirmation screen on the screen 470 is used. For example, When FedEx delivers the suitcase 132 to the hotel, an employee would have to sign for the suitcase (e.g., using the screen 470) or touch an icon on the screen 470 indicating acceptance and/or correct delivery. In some embodiments, the dynamic display comprises a camera, and when the screen 470 is touched (e.g., touching the icon), and/or signed, the camera activates to acquire one or more pictures and/or a video segment. In some embodiments, the one or more pictures and/or video segment are used to help verify who accepted the suitcase 132.

In some embodiments, a copy of what is displayed on the screen 470 is transmitted for display on a second device. For example, the customer has a smartphone and a customer app on the smart phone has a feature to display on the smartphone what is displayed on the screen 470. In some embodiments, the customer app is configured to display similar information to what is displayed on the screen 470. For example, the screen 470 actually displays a 2-D barcode; and the customer app displays a small image of the 2-D barcode and a textual translation and/or summary of information contained in the 2-D barcode. In some embodiments, the customer app is configured to present information on the screen 470 in a common format to the customer even though the screen 470 may actually display delivery instructions in multiple different formats. Examples of information presented by the customer app include: parcel number, delivery address, an image of the screen 470, a history of changes to the screen 470, and future, expected changes to the screen 470. For future, expected changes a whole label, partial label, and/or delivery information could be shown. For example, if a carrier is already selected, then a whole label could be shown (e.g., including a carrier's parcel number); but if a carrier is not selected yet, then just a next destination address and/or location is displayed.

In some embodiments, the screen 470 is also a touch screen and the luggage engine 404 receives information through the touch screen. For example, once a courier receives the suitcase 132, the courier enters a code in the touch screen. The screen 470 then displays the address of the UPS store nearby and the bellhop is satisfied that the courier is authentic and taking the correct piece of luggage. In optional aspects of some embodiments, the display engine 508 and/or the luggage engine 404 determine the information, or the format of the information, to be displayed, or that no information is to be displayed, on the screen 470 based on instructions or information received via the modem 416 or based on location, time and/or date, interaction with another device or with a software application on another device, identity of another entity such as a transportation or other service provider, an event, an event within a sequence of events, and/or receipt of manual input at the suitcase.

The display engine 508 is linked to the modem 416. The display engine 508 receives and/or sends instructions and/or data to the modem 416. In some embodiments, the display engine 508 changes what is displayed on the screen 470 based on received instructions and/or data from the modem 416. In some embodiments, the display engine 508 transmits data about the suitcase 132 (e.g., location, delivery confirmation, etc.) to the modem 416. The modem 416 is explained in more detail in the discussion of FIG. 6 below.

The power source 516 of the dynamic display 412 can be separate or combined with a power system of the suitcase 132. In some embodiments, the power source 516 is a battery. In some embodiments, the power source 516 is AC power (e.g., 420V, 240V, and/or 250V) and/or DC power (e.g., power from a USB cable and/or a battery or batteries). In some embodiments, data is transferred through the USB cable to and from the suitcase 132. In some embodiments, power source 516 is a battery that can be recharged wirelessly, for example when the battery is within range or a wireless recharging component.

The dynamic display 412 further comprises display memory 520. In some embodiments, the display memory 520 is part of the luggage memory 408. In some embodiments, the display memory 520 is separate from the luggage memory 408.

In FIG. 5B, a simplified sketch of an embodiment of the console 466 is shown. The console 466 comprises the screen 470 (as part of the dynamic display 412), the locking mechanism 474, the mechanical-access lock 482, and the antenna 478. Also shown as part of the console 466 is a port 524 (e.g., used to make an electrical connection with another device using structures such as USB, Firewire (IEEE 1394), eSATA, Ethernet, HDMI, Display Port, Lightning, RCA, S-Video, phone connector (e.g., TS, TRS, TRRS), and/or other wired connection), and a battery door 528. In some embodiments, the port 524 is used to power the console 466. In some embodiments, the port 524 is used power another device. In some embodiments, the port 524 is used to send and receive information to and from the processor and/or memory device of the console 466. In some embodiments, the port 524 is used to charge another device (e.g., a mobile phone). The battery door 528 is used to access a battery compartment. The battery compartment holds one or more batteries as a power source for the console 466 (e.g., AAA, AA, C, D, button cell, lithium, etc.). In some embodiments, the console 466 further comprises a solar panel to completely or partially power the console 466. The console 466 is shown further comprising the locking mechanism 474 and the mechanical-access lock 482. The zipper pulls 458 are secured using the locking mechanism 474. The locking mechanism 474 can be unlocked by receiving an electronic signal (e.g., via the antenna 478 and/or the port 524). In some embodiments, the mechanical-access lock 482 is used in addition to an electronic locking device to unlock the locking mechanism 474. For example, the mechanical-access lock 482 is a tumbler-style lock that is TSA (Transportation Security Administration) compliant so that the suitcase 132 can be opened by TSA. In another example, the mechanical-access lock 482 is used if the console 466 loses power and/or if other problems arise using an electronic signal to unlock the suitcase 132. In some embodiments, the mechanical-access lock 482 is a tubular lock, a combination lock, magnetic-keyed lock, and/or other type of lock. In some embodiments, the console 466 is built into a suitcase 132 during manufacturing. In some embodiments, the console is inside the suitcase 132 and the console does not comprise the tamper lock 420.

FIG. 5C shows a simplified side view of an embodiment of the console 466. The console has a front comprising the screen 470 and a back 560 opposite the front. Bolts 564 protrude from the back 560 of the console 466. Nuts 568 screw on the bolts to secure material between the nuts 568 and the back 560 of the console 466. The bolts 564 and nuts 568 are used to secure the console 466 to a pre-made piece luggage or other bag (e.g., the pre-made piece of luggage is manufactured by an entity different from an entity that manufactured the console 466 and/or that operates the logistics system 108).

Figure 6:
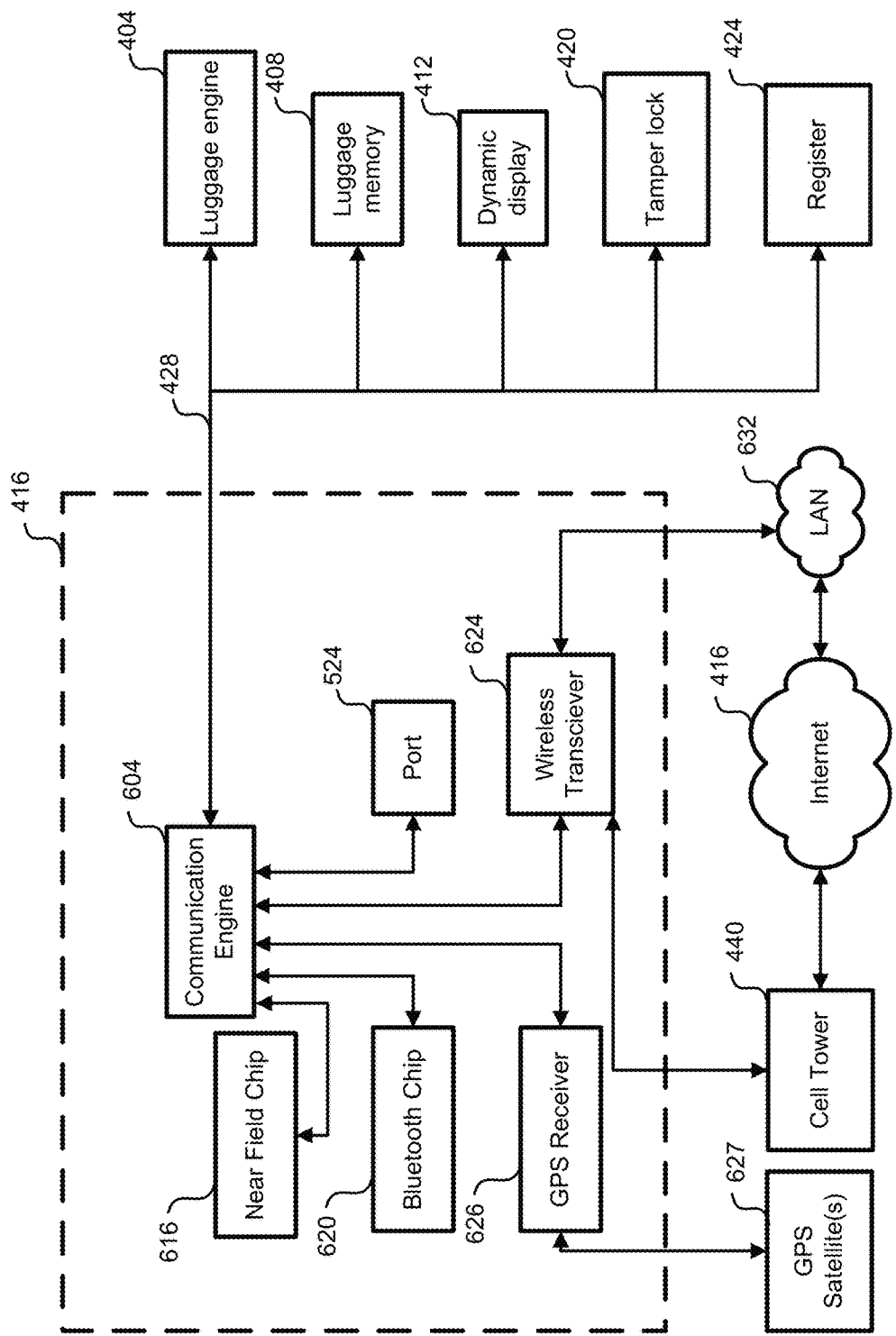
FIG. 6 depicts a block diagram of an embodiment of a modem of the suitcase.

Referring next to FIG. 6, a block diagram of an embodiment of the modem 416 is shown. The modem 416 allows the suitcase 132 to communicate with the customer, a service provider (e.g., hotel staff and/or dry cleaning staff), and/or other devices (e.g., a station or server for the modem 416 to beacon back location/status of the suitcase 132 and/or a customer device), or communicate wirelessly with other authorized or authenticated systems. The modem 416 comprises a communication engine 604 in communication with various communication elements. In this embodiment, the communication engine 604 is connected to a USB (Universal Serial Bus) port 524, a near field chip 616, a Bluetooth chip 620, and a wireless transceiver 624. It will be appreciated that the various communication elements need not all be present in other embodiments. For example, in some embodiments of the modem 416, the modem 416 does not have the near field chip 616. In some embodiments, the modem 416 has only the communication engine 604 and the wireless transceiver 624. The modem 416 has one or more of the various communication elements depending on cost and desired functionality.

In some embodiments, the modem 416 comprises a GPS receiver 626 that receives signals from one or more GPS satellites 627. The GPS receiver provides to the logistics system 108 updates regarding a location of the suitcase 132.

The communication engine 604 is also connected, by the communication bus 428, to the luggage engine 404, the luggage memory 408, the dynamic display 412, the tamper lock 420, and the register 424.

The port 524 provides a wired port to the modem 416. Though the embodiment in FIG. 6 has a port 524, other wired ports could be used to establish a wired connection between the suitcase 132 and another device.

The near field chip 616 and the Bluetooth chip 620 provide relatively close-range communication between the suitcase 132 and second device. In some embodiments, close-range communication is less than 10, 5, or 2 feet separation between the suitcase 132 and the second device.

The wireless transceiver 624 enables the communication engine 604 to connect with a cell tower. Thus the modem 416 can send and/or receive data (e.g., text messages) using mobile phone technology. Further, in some embodiments, the wireless transceiver 624 is configured to connect to a local area network (LAN) 632 and/or a wide area network. In some embodiments, two wireless transceivers 624 are used, one to connect to the cell tower 140 (e.g., 700, 800, 850, and/or 4900 MHz) and one to connect to the LAN 632 (e.g., 900, 2400, and/or 5000 MHz). In some embodiments, the cell tower 140 and/or the LAN 632 provide a connection to the Internet 116.

In some embodiments, the modem 416 also comprises an RFID chip. The RFID chip is used to identify the suitcase 132 to another device.

Figure 7A:
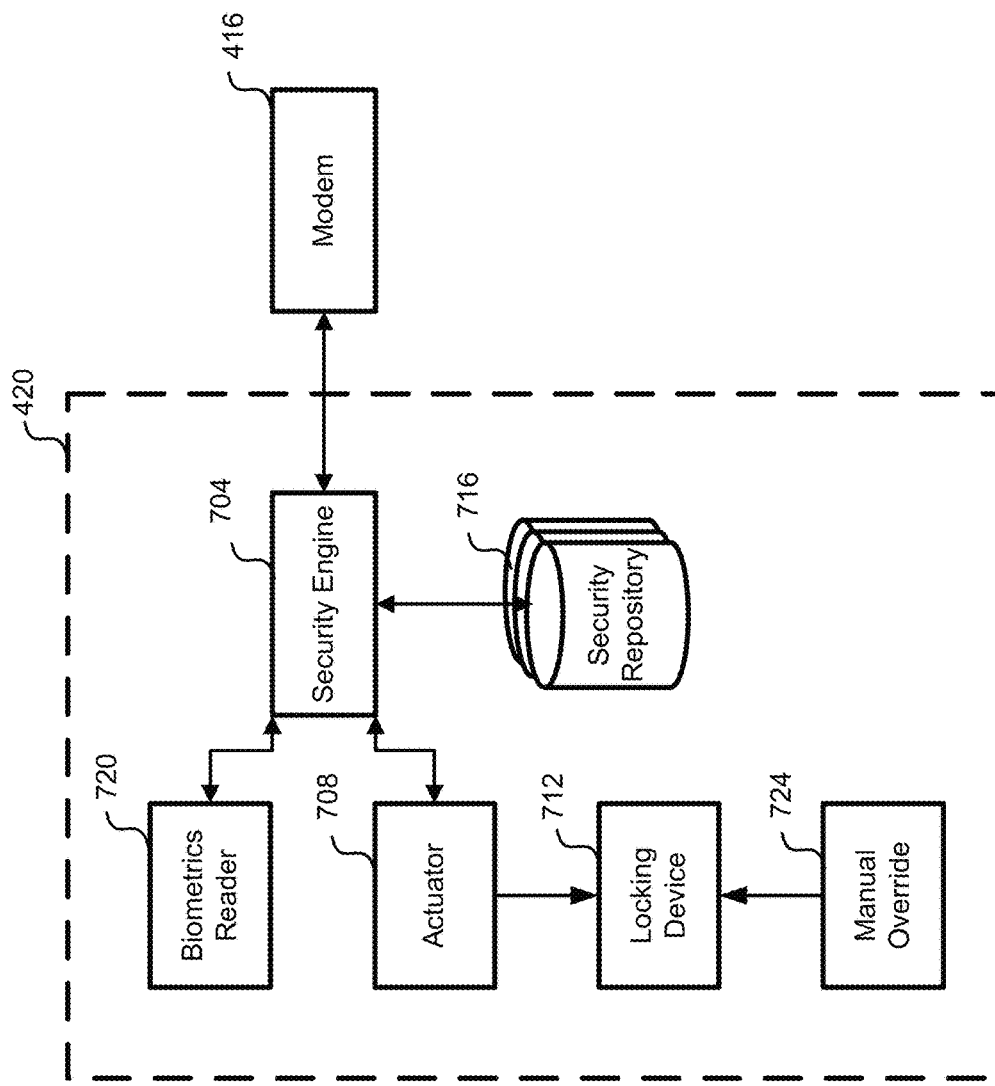
FIG. 7A depicts a block diagram of an embodiment of a tamper lock of the suitcase.

Referring next to FIG. 7A, a block diagram of an embodiment of the tamper lock 420 of the suitcase 132 is shown. The tamper lock 420 comprises a security engine 704, an actuator 708, a locking device 712, a security repository 716, a biometrics reader 720, and a manual override 724. The locking device 712 locks the suitcase 132. For example, the locking device 712 comprises the locking mechanism 474, wherein zipper pulls 458 of the suitcase 132 are secured by the locking mechanism 474. In some embodiments, the locking device 712 is integrated into a housing (e.g., console 466) that also comprises the screen 470. In some embodiments, some or all of the security engine 704, the security repository 716, a subset of the security engine 704, a subset of the security repository 716, or the biometrics reader 720 are physically separate from the suitcase and/or from the other components. For example, the security repository 716 and an authenticating subset of the security engine 704 may operate from a secured network location, interacting with an application software module executing on a smartphone that utilizes a smartphone's fingerprint reader component as the biometrics reader 720; in this example embodiment, the smartphone application software module reads a fingerprint read from the smartphone fingerprint reader to obtain biometric data, transmits the biometric data to the authenticating subset of the security engine 704, which in turn authenticates the biometric data against the security repository 716, and upon successful authentication of the biometric data issues an unlock code or command to the security engine 704 in the suitcase, or to the luggage engine 404 in the suitcase, or to the locking device 712 in the suitcase.

The security engine 704 is in communication with the modem 416 and the biometrics reader 720. The actuator 708 unlocks the locking device 712. The security engine 704 receives a request to unlock the locking device 712 from the modem 416 and/or the biometrics reader 720. The security engine 704 queries the security repository 716 to authenticate the request to unlock the locking device 712. After the security engine 704 authenticates the request to unlock the locking device 712, the security engine 704 transmits a signal to the actuator 708 to unlock the locking device 712. In some embodiments, the actuator 708 uses an electromagnet.

As an example, a customer wishing to unlock the suitcase 132 uses an interface on a mobile device to request the suitcase 132 to be unlocked. The request for the suitcase 132 to be unlocked is transmitted from the mobile device to the modem 416 of the suitcase 132. The request for the suitcase 132 to be unlocked could be transmitted to the modem 416 via the Internet 116, the LAN 632, the cell tower 140, the Bluetooth chip 620, and/or the port 524. The modem 416 transmits the request for the suitcase 132 to be unlocked to the security engine 704. The security engine 704 authenticates the request to the suitcase 132 to be unlocked by retrieving a data file from the security repository 716. After authentication, security engine 704 transmits a signal to the actuator 708. The actuator 708 then unlocks the locking device 712 and the customer can open the suitcase 132. In some embodiments, an open-and-lock log is kept and/or transmitted to the customer.

In some embodiments, the customer sends a text message with a code to the modem 416 and/or a central server and the locking device 712 is unlocked. In some embodiments, a user (e.g., customer and/or service provider(s)) wishing to unlock the suitcase 132 use a fingerprint reader on a mobile device for authentication. In some embodiments, the suitcase 132 has multiple compartments with different locking devices 712. For example, one compartment of the suitcase 132 is used for clothing and a second compartment of the suitcase 132 is used to store valuables (e.g., watches and jewelry). The first compartment has a locking device 712 that can be unlocked by a dry cleaner, so the dry cleaner can remove and wash the clothes. But the second compartment has a locking device 712 that can be opened by only the customer (with maybe one exception being help-desk support). In some embodiments, the second compartment can be opened only manually.

In some embodiments, authentication is performed remotely from the suitcase 132. For example, the customer requests the suitcase 132 to be unlocked using a mobile device. The request for the suitcase 132 to be unlocked is transmitted to a central server. The central server authenticates the request for the suitcase 132 to be unlocked. The central server then sends a command to the modem 416 of the suitcase 132 for the security engine 704 to unlock the locking device 712. The request for the suitcase 132 to be unlocked is transmitted to the central server or to the modem 416 of the suitcase. The customer is then provided a temporary pin (e.g., via text message or through a user interface). The customer enters the temporary pin (e.g., a touch screen part of the screen 470) and the locking device 712 is unlocked. In some embodiments, a text message with a temporary pin is generated and sent to the customer automatically after the customer requests the suitcase 132 be sent to a destination.

In some embodiments, the tamper lock 420 has a manual override 724 so that a customer can unlock the suitcase 132. For example, the manual override 724 is a combination lock having buttons, scrolls, and/or wheels with characters and/or numbers. In some embodiments, the manual override 724 is a tangible key.

Figure 7B:
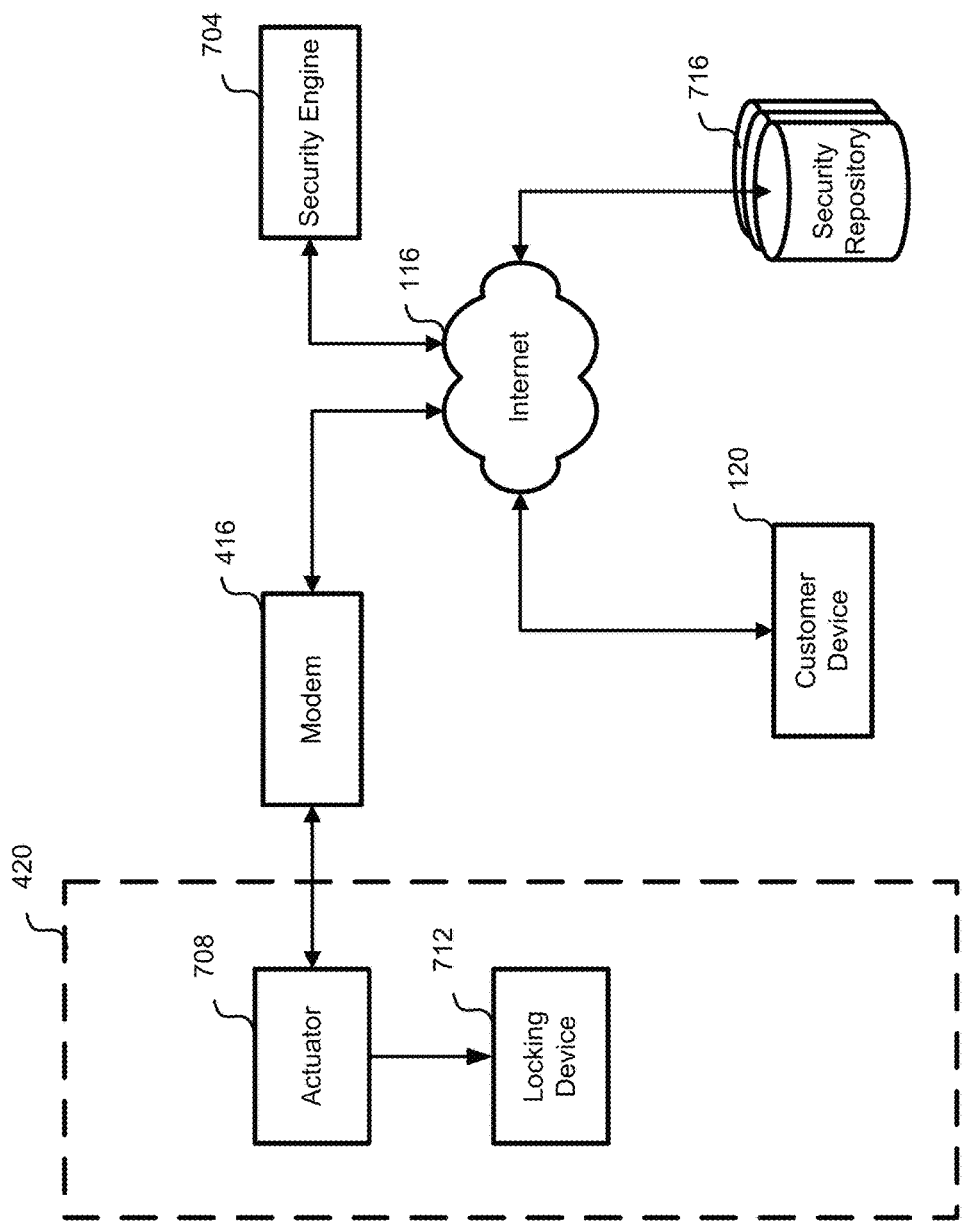
FIG. 7B depicts a block diagram of another embodiment of the tamper lock of the suitcase.

Referring next to FIG. 7B, a block diagram of another embodiment of the tamper lock 420 of the suitcase 132 is shown. In FIG. 7B, the tamper lock 420 comprises the actuator 708 and the locking device 712. The actuator 708 is electronically connected with the modem 416. The security engine 704 and the security repository 716 are located away from the suitcase 132. The modem 416 communicates with the security engine 704 and/or the security repository 716 via the Internet 116. A customer device 120 is also connected to the Internet 116. In this embodiment, the customer device 120 transmits a request, including credentials, to the security engine 704 for the suitcase 132 to be unlocked. The security engine 704 is located on a server connected to the Internet 116. The security engine 704 compares the credentials with a key in the security repository 716 (e.g., the security repository 716 stored on a hard drive (or other storage device) of the server or on a hard drive (or other storage device) of a different server). The security engine 704 authenticates the request from the customer device 120 and transmits a signal to the modem 416 for the suitcase to be unlocked. The modem 416 transmits the signal to the actuator 708, and the actuator 708 unlocks the locking device 712. In some embodiments, having the security engine 704 and the security repository 716 separate from the suitcase 132 enables a system to take advantage of computing and storing information in the cloud.

Figure 8:
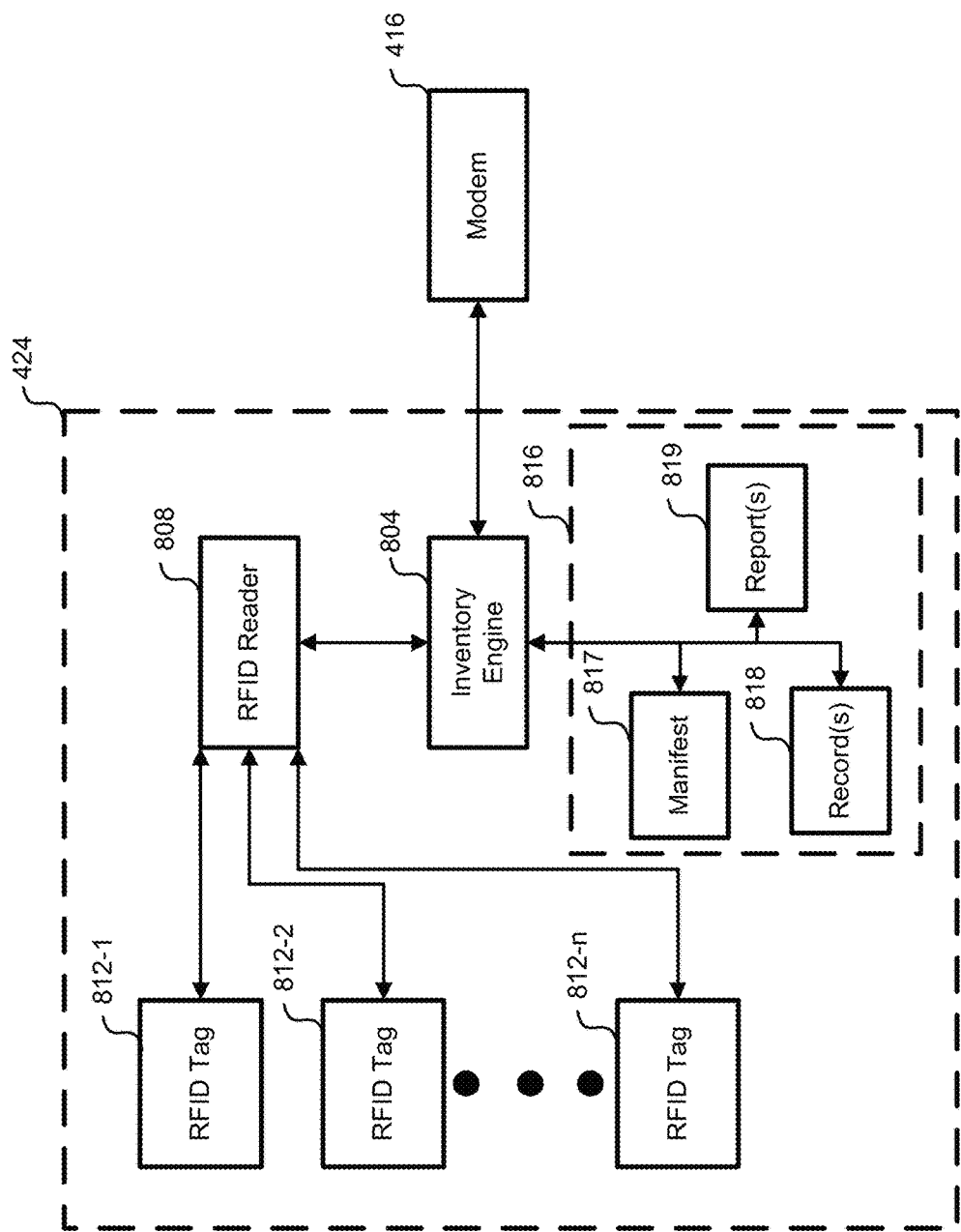
FIG. 8 depicts a block diagram of an embodiment of a register of the suitcase.

Referring next to FIG. 8, a block diagram of an embodiment of the register 424 of the suitcase 132 is shown. The register 424 comprises an inventory engine 804, an RFID reader 808, a plurality of RFID tags 812, and an inventory repository 816. The RFID reader 808 is attached to the suitcase 132 and is in communication with the modem 416. The RFID tags 812 are attached to items to be put in the suitcase 132. In some embodiments, the RFID tags 812 are placed on or in personal items. For example, RFID tags are sewn into shirt and/or pant hems. In some embodiments, optically readable or scan-able tags, such as barcode tags, OCR tags, and other printed or preprinted tags, are used instead of, or in addition to, RFID tags. In some embodiments, some or all of the inventory engine 804, RFID reader 808, and inventory repository 816 are physically separate from the suitcase and/or from the other components.

The inventory engine 804 causes the RFID reader 808 to sense which RFID tags 812 are within range of the RFID reader 808. The RFID reader 808 receives an indication which RFID tags 812 are within range. In some embodiments, the RFID tags that are within range are recorded and time stamped and a file stored in the inventory repository 816.

The inventory repository 816 stores a manifest 817 and/or an inventory list (e.g., records 818 of items in the suitcase) for the suitcase 132. In some embodiments, the inventory repository 816 stores an inventory list of items belonging to the customer, but not currently in the particular suitcase 132, either in another suitcase associated with the customer or not currently in any suitcase associated with the customer; stores information about, or attributes related to, the customer, or about a group including the customer (such as the customer's household members), or about one or more groups that may be related to the customer, such as sizes, styles, brand preferences, and the like; stores inventory history of the suitcase 132; and/or stores item utilization history associated with the suitcase 132, the customer, or both. The inventory list comprises items that were in the suitcase 132 when the inventory list was created. The inventory engine 804 compares the inventory list to the items corresponding to the RFID tags 812 that are within range of the RFID reader 808. The inventory engine 804 creates a reconciliation report 819, wherein the reconciliation report 819 identifies items that are on the inventory list and are within range of the RFID reader 808. The reconciliation report 819 also identifies items that are on the inventory list but do not have a corresponding RFID tag 812 that is within range of the RFID reader 808.

In some embodiments, if an RFID tag 812 is out of range of the RFID reader 808 for more than a given time period (e.g., 10, 20, 30, or 60+ minutes) then the personal item associate with the RFID tag 812 is flagged. In some embodiments, flagged personal items are washed after the suitcase 132 is returned from a destination. In some embodiments, personal items are individually wrapped in plastic if they are clean. If a personal item is removed from the plastic wrap then the personal item is flagged for cleaning after the customer returns the suitcase 132. In some embodiments, a moisture sensor and/or temperature sensor are used to determine if a personal item is flagged for cleaning. In some embodiments, different compartments in the suitcase 132 are used to determine if a personal item is flagged for cleaning (e.g., clothing items to be cleaned are placed in a first compartment, and clothing items not needing cleaned are placed in a second compartment). In some embodiments the suitcase 132 can be tagged not to be opened. In such embodiments, the suitcase 132 is not opened even though some items may be flagged for processing. In some embodiments, the customer can turn on and/or off the tag for the suitcase 132 to not be opened. For example, after a first trip the customer turns on the tag for the suitcase 132 not to be opened, but after a second trip the customer turns off the tag for the suitcase 132 not to be opened. A customer may choose to turn off the tag for the suitcase 132 not to be opened based on a schedule and/or event (e.g., after every third trip or before a trip if there has been nonuse of the suitcase 132 for over three months).

In some embodiments, the RFID tags 812 comprise information such as an account number of a customer and/or an item tag of a specific item. In some embodiments, the RFID tags 812 comprise instructions. For example, a first RFID tag 812-1 is sewn into a shirt and contains instructions to launder and press using heavy starch. After the suitcase 132 is returned by the customer, a dry cleaner uses an RFID reader and receives instructions for cleaning and starching the shirt.

Referring next to FIG. 9A, a block diagram of an embodiment of an inventory display system for the suitcase 132 is shown. FIG. 9A is similar to FIG. 8 with the addition that the modem 416 is in contact with a customer device 120 (e.g., similar to customer device 120 in FIG. 7B). Examples of a customer devices 120 include personal computers, mobile phones, tablets, and computerized eyewear (e.g., Google Glass). The modem 416 can be in contact with the customer device 120 using one or more of the various communication elements as describe in FIG. 6.

The inventory engine 804 transmits the reconciliation report 819 and/or records 818 through the modem 416 and to the customer device 120. Thus, in some embodiments, the customer can know the contents of the suitcase 132 in real time or near real time (based on the refresh rate of the RFID reader 808 and communication speed of the customer device 120 with the modem 416). In some embodiments, the reconciliation report 819 is transmitted to a service provider.

Figure 9B:
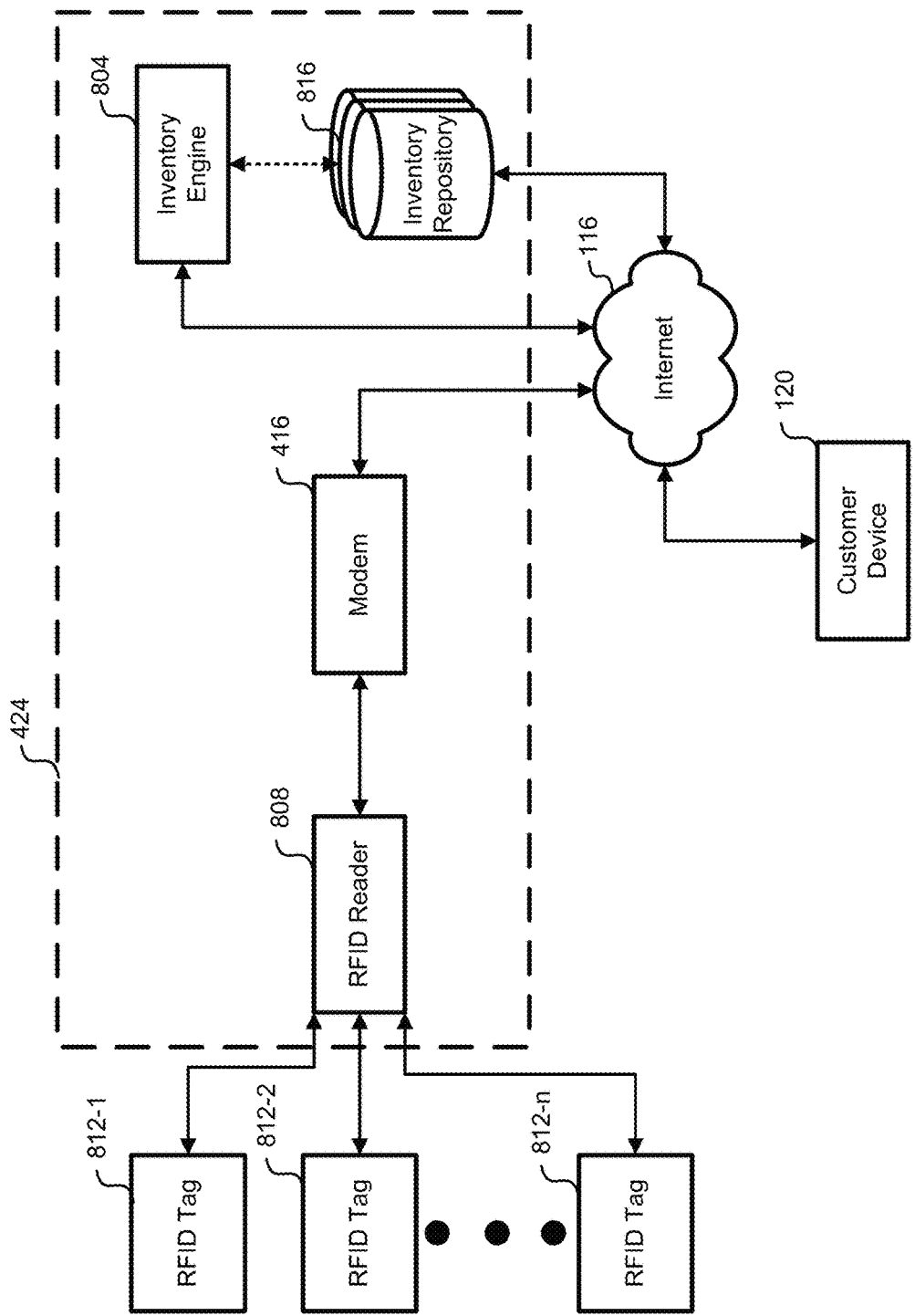
FIG. 9B depicts a block diagram of another embodiment of register of the suitcase.

Referring next to FIG. 9B, a block diagram of another embodiment of the inventory display system for the suitcase 132 is shown. In FIG. 9B, the register 424 comprises the RFID tags 812 and the RFID reader 808. The RFID reader 808 is electronically connected with the modem 416. The inventory engine 804 and the inventory repository 816 are located away from the suitcase 132. The modem 416 communicates with the inventory engine 804 and/or the inventory repository 816 via the Internet 116. The inventory engine 804 is located on a server connected to the Internet 116. The inventory repository 816 is stored on a hard drive (or other storage device) of the server or a different server. The customer device 120 is also connected to the Internet 116. In this embodiment, information about RFID tags 812 is transmitted from the RFID reader 808 to the modem 416 and to the inventory engine 804 and/or the inventory repository 816 via the internet 116. The inventory engine 804 transmits the reconciliation report 819 and/or other information to the customer device 120 via the Internet 116. The inventory engine 804 also receives requests for information from the customer device 120 via the Internet 116. In some embodiments, having the inventory engine 804 and the inventory repository 816 separate from the suitcase 132 enables a system to take advantage of computing and storing information in the "Cloud."

It will be appreciate by those skilled in the art that elements and/or functionality of the suitcase 132 in FIGS. 4 through 9 can be combined, omitted, and/or rearranged based on design criteria and desired functionality. It will be appreciated by those skilled in the art that further elements of the suitcase 132 can be performed and/or moved into the "Cloud" (such as the luggage engine 404 and/or luggage memory 408). For example, in some embodiments, the suitcase 132 comprises the dynamic display 412, the wireless transceiver 624, the actuator 708, and the locking device 712; the luggage engine 404, the luggage memory 408, the display engine 508, the communication engine 604, and the security engine 704 are consolidated to a server connected to the Internet 116; and the register 424, the near field chip 616, the port 524, and the Bluetooth chip 620 are omitted. In some embodiments, the tamper lock 420 is also omitted.

In some embodiments, the reconciliation report comprises a graphic for each item on the inventory list. For an item on the inventory list that is not within range of the RFID reader, the graphic is muted (e.g., grayed out). In some embodiments, the customer can select an item on the reconciliation report and provide instruction for processing the item on the reconciliation report. For example, the customer can request the item on the reconciliation report 819 be mended. In another example, the customer requests the item on the reconciliation report 819 be removed from the manifest 817 of the suitcase 132 and/or requests the item be replaced with another specific item (e.g., a particular shirt), or generally with another item (e.g., another business shirt having buttons and a collar).

Figure 10:
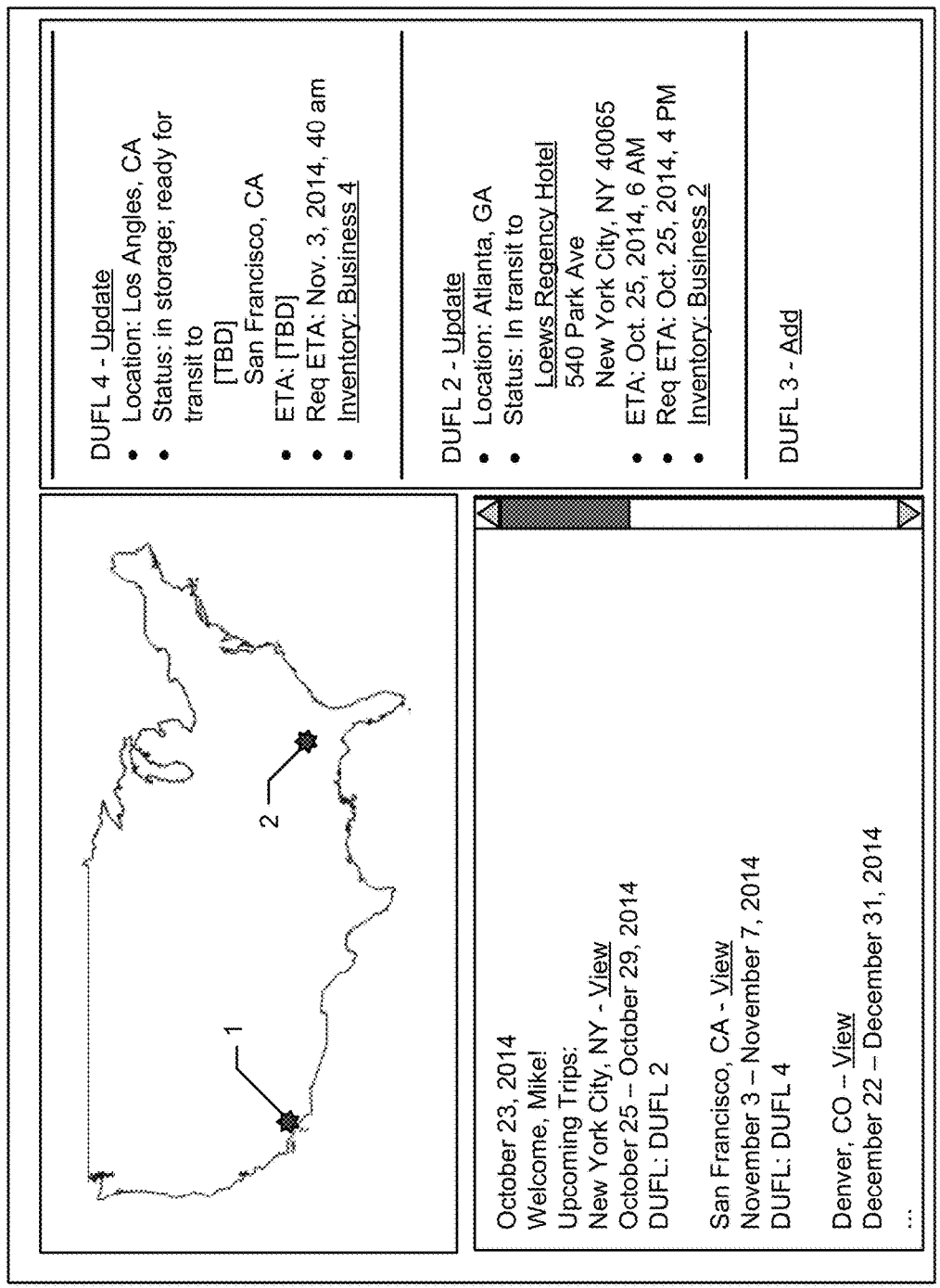
FIG. 10 depicts a simplified diagram of a customer interface for managing shipping of one or more suitcases.

In FIG. 10, a simplified diagram of a customer interface for managing shipping of one or more suitcases 132 is shown. In some embodiments, a customer has more than one suitcase 132. The customer interface 324 enables the customer to track and manage suitcases 132. In some embodiments, a customer has more than one suitcase 132 and stores suitcases 132 based on travel history and/or preferences of the customer. For example, the customer could have a first suitcase 132-1 staged (e.g., stored) on the west coast of the United States and a second suitcase 132-2 staged on the east coast of the United States.

Figure 11:
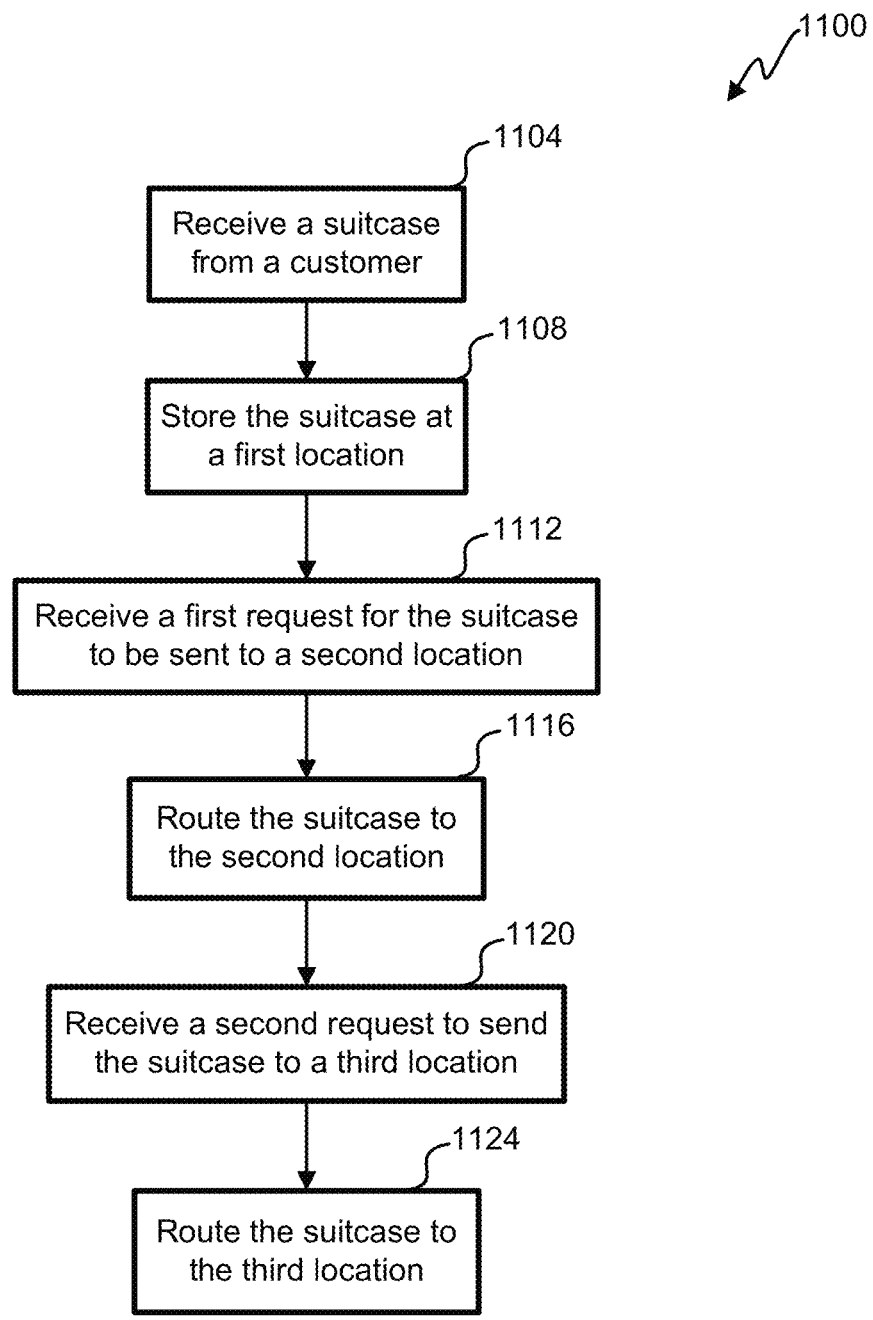
FIG. 11 illustrates a flowchart of an embodiment of a process for routing a suitcase for delivery.

FIG. 11 illustrates a flowchart of an embodiment of a process 1100 for routing a suitcase 132 for delivery. The process 1100 for routing a suitcase begins in step 1104 where a suitcase 132 is received from a customer. In some embodiments, the customer takes pictures of items placed in the suitcase 132 and uploads the pictures through the customer interface 324. In some embodiments, an inventory of the suitcase 132 is made after the suitcase 132 is received from the customer. In some embodiments, if the inventory of the suitcase 132 is made after the suitcase 132 is received from the customer, the customer is allowed to modify names and/or pictures of inventory items.

In step 1108, the suitcase is stored at a first location. In some embodiments, the first location is the storage facility 150. A first request for the suitcase 132 is received, wherein the first request specifies that the suitcase 132 is to be sent to a second location, step 1112. The suitcase 132 is routed to the second location, step 1116. In step 4120, a second request is received, wherein the second request specifies that the suitcase is to be sent to a third location. In step 4124, the suitcase 132 is routed to the third location.

In some embodiments, the logistics system 108 provides the customer with information about two suitcases, a first suitcase 132-1 and a second suitcase 132-2; and receives instructions from the customer that include a desired location to send the first suitcase 132-1 to a first desired location and to send the second suitcase 132-2 to a second desired location. In some embodiments, the first desired location is different from the second desired location (e.g., different cities). In some embodiments, the suitcase 132 is stored at a fourth location after being routed to the second location and before being routed to the third location. In some embodiments, the suitcase is stored at the fourth location based on a travel history of the customer; customer preference; and/or future travel plans. In some embodiments, items in the suitcase 132 are processed (e.g., cleaned, polished) before the suitcase 132 is routed to the third location. In some embodiments, the screen 470 is used in routing the suitcase 132 (e.g., displays a FedEx label). In some embodiments, paper labels are used in routing the suitcase 132.

In some embodiments, the logistics system 108 provides the customer flight information, emergency notifications regarding events near the second location and/or the third location, and/or tips regarding travel and using the suitcases 132. For example, tips could include suggested items to pack and/or remove from the suitcase; suggested items to bring that are not included in the suitcase 132; and/or a suggestion to get another suitcase 132 based on travel history.

Figure 12:
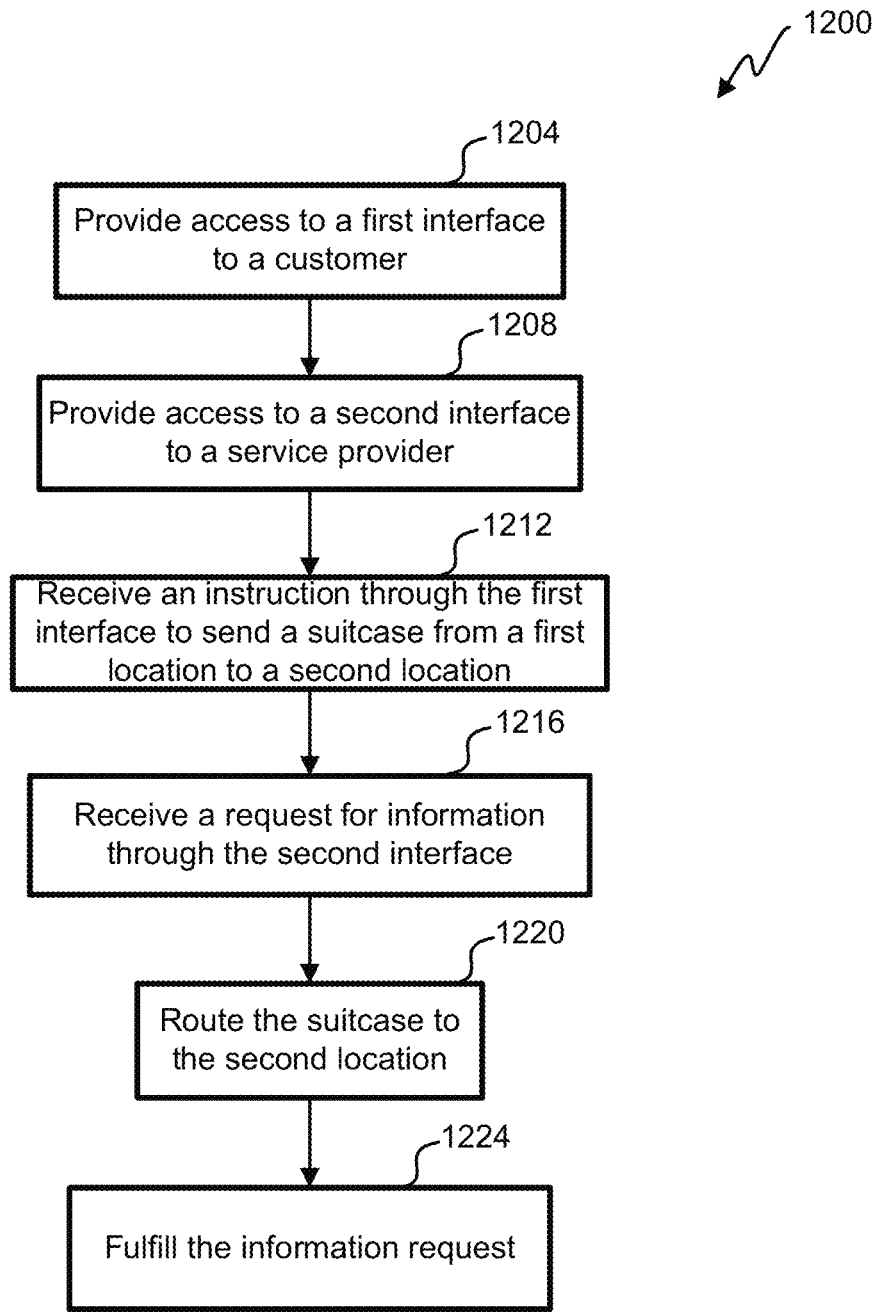
FIG. 12 illustrates a flowchart of an embodiment of a process for routing a suitcase for delivery using multiple interfaces.

Referring next to FIG. 12 a flowchart of an embodiment of a process 4200 for routing a suitcase 132 for delivery using multiple interfaces is shown. The process 4200 for routing a suitcase using multiple interfaces begins in step 4204 by providing access to a first interface (e.g., customer interface 324) to the customer. In step 4208, a service provider is given access to a second interface (e.g., service interface 364). In step 1212, an instruction is received through the first interface to send the suitcase 132 from a first location (e.g., storage facility 150) to a second location (e.g., destination). In step 1216, a request for information is received through the second interface. In step 1220 the suitcase 132 is routed to the second location. And in step 1224, the request for information is fulfilled.

In some embodiments, a second instruction is received, the second instruction being received from the service provider through the second interface; wherein the service provider is a dry cleaning business and the second instruction is to open the suitcase. In some embodiments, requests are authenticated. In some embodiments, the service provider is a hotel and the request for information is a room number of the customer. In some embodiments, the service provider is a cleaner and the request for information is for a list of items and/or processing instruction for items in the suitcase 132.

Figure 13:
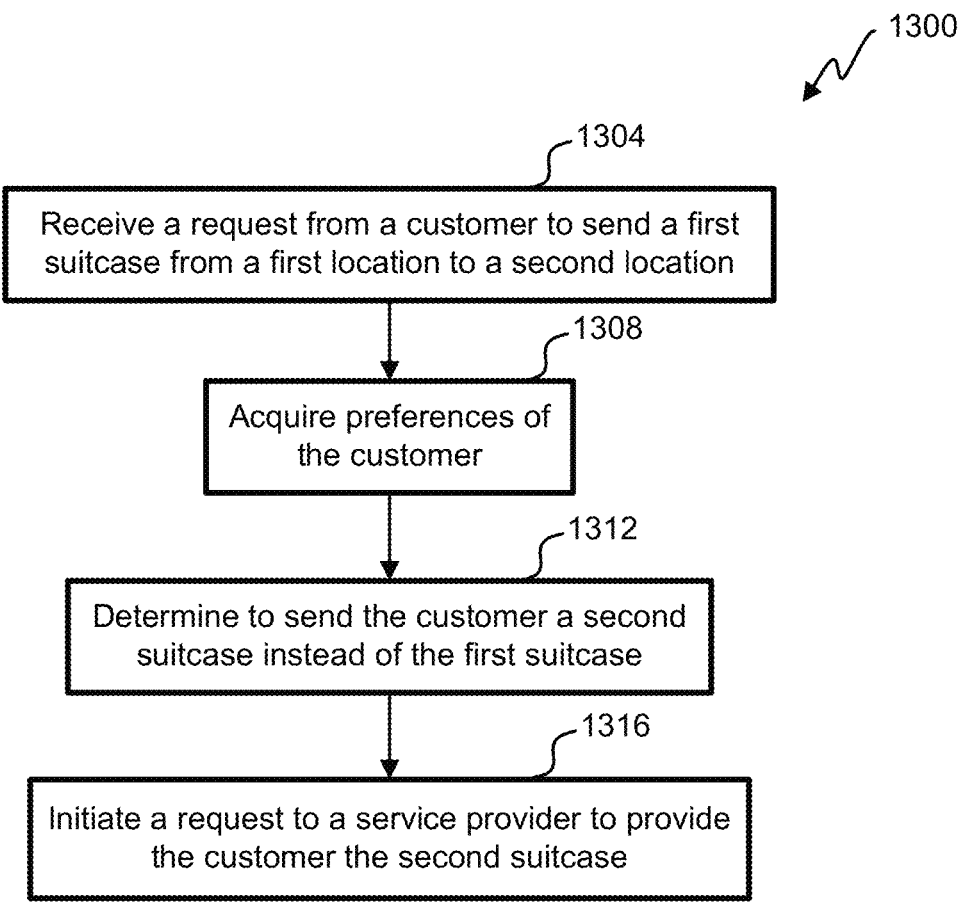
FIG. 13 illustrates a flowchart of an embodiment of a process for providing a second suitcase to a customer when a first suitcase is unavailable.

FIG. 13 illustrates a flowchart of an embodiment of a process 1300 for providing a second suitcase to a customer when a first suitcase is unavailable. The process 1300 beings in step 1304 where a request is received from the customer to send a first suitcase from a first location to a second location. In step 1308 preferences of the customer are acquired. In some embodiments, preferences include clothing sizes, clothing styles, and/or toiletry preferences (e.g., brand of toothpaste). In step 1312 a determination is made to send the customer a second suitcase instead of the first suitcase. In some embodiments, the second suitcase in an emergency suitcase. In step 1316 a request is sent to a service provider to provide the customer the second suitcase.

In some embodiments, the process 1300 for providing the second suitcase is used when a customer is flying from one city and an airplane that the customer is flying is gets diverted. For example, a customer is flying to New York City but the airplane is diverted to Washington, D.C. because of a snowstorm in New York City. A service provider in Washington, D.C. is contacted and compiles a change of clothes and some toiletries for the emergency suitcase. In some embodiments, toiletry samples are provided by vendors (e.g., free samples). In some embodiments, the service provider is a retail store (e.g., department store and/or drug store). In some embodiments, the customer requests the emergency suitcase. In some embodiments, an emergency suitcase is prepared based on flight information of the customer without input from the customer.

In some embodiments, the emergency suitcase is provided if the suitcase of the customer can't be delivered because of a delay by the package-delivery service 166. In some embodiments, the emergency suitcase is provided if the suitcase of the customer can't be rerouted in time because of a schedule change of the customer. In some embodiments, if the customer changes a schedule, or requests a suitcase be delivered within a short time period (e.g., within 24, 48, or 72 hours), the customer is given price options for delivering the suitcase and the emergency suitcase. The customer can then select from the price options what the customer prefers to receive. In some embodiments, in lieu of or in addition to the emergency suitcase, the suitcase is rerouted for the customer. For example, the suitcase could be rerouted from New York City to Washington, D.C. (either by request from the customer or based on a stored preference of the customer). In some embodiments, delivery time of one or more suitcases is calculated and presented to the customer. For example, the customer may be willing to wait twelve hours for the suitcase in New York to be delivered to Washington, D.C. if given the option.

Figure 14:
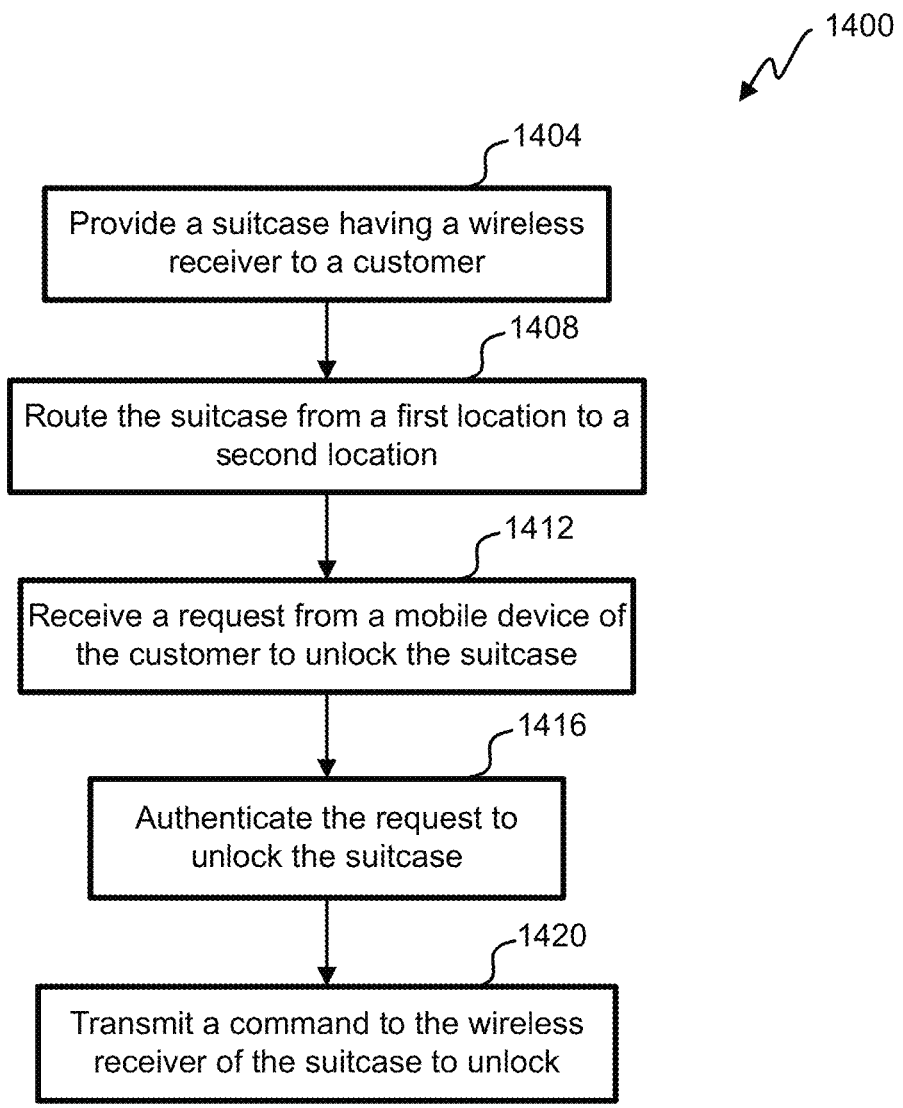
FIG. 14 illustrates a flowchart of an embodiment of a process for unlocking a suitcase with a mobile device.

Referring next to FIG. 14 a flowchart of an embodiment of a process 1400 for unlocking a suitcase 132 using a mobile device is shown. Process 1400 beings in step 1404 by providing to a customer a suitcase having a wireless receiver (e.g., suitcase 132 with wireless transceiver 624). In step 1408 the suitcase 132 is routed from a first location (e.g., storage facility 150) to a second location (e.g., a destination selected by the customer). In step 1412, a request is received from a mobile device of the customer to unlock the suitcase 132. In step 1416, the request to unlock the suitcase 132 is authenticated. In step 1420, a command is transmitted to the wireless receiver to unlock the suitcase.

Figure 15:
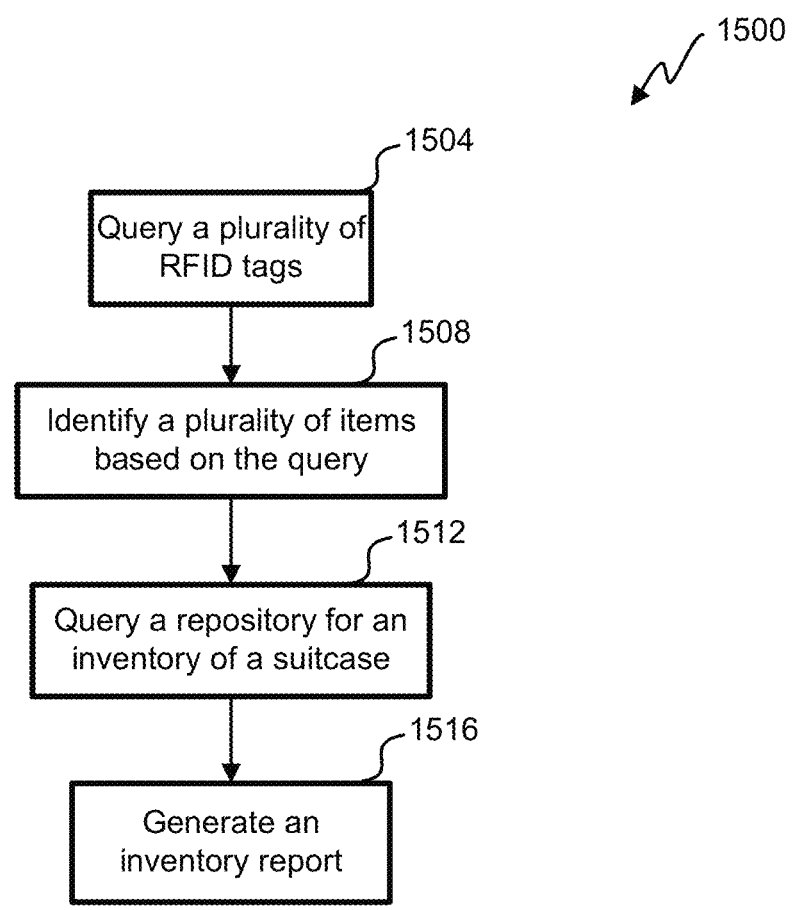
FIG. 15 illustrates a flowchart of an embodiment of a process for tracking items in a suitcase.

Referring to FIG. 15 a flowchart of an embodiment of a process 4500 for tracking items in a suitcase is shown. Process 4500 for tracking items in a suitcase begins in step 4504 where a plurality of RFID tags are queried (e.g., sensed by RFID reader 808 attached to suitcase 132). In step 4508, a plurality of items are identified based on querying the plurality of RFID tags. In step 1512 a repository is queried for an inventory of the suitcase 132. In some embodiments, the repository is in a memory device on the suitcase 132. In step 1516 an inventory report (e.g., a reconciliation report as described with FIG. 8) is generated.

A number of variations and modifications of the disclosed embodiments can also be used. For example, other luggage and/or containers besides a suitcase could be used. For example, portable containers configured to be shipped can be used. In some embodiments, portable containers configured to transport business equipment for presentations, such as presentation materials (e.g., posters, projection screens, and/or projectors), are used. In some embodiments, luggage for sporting equipment are used (e.g., containers for skis, golf clubs, hunting rifle/gear, and/or SCUBA gear). For example, a unit comprising functionality of the dynamic display 412 and modem 416 is fastened to a hardened case (e.g., Pelican rifle case 472-PWC-M14-1) by the customer. The customer places a rifle in the hardened case and uses a smartphone app to select a destination for the hardened case. Thus the customer does not need to declare a firearm when traveling by air or worry about traveling with the rifle through locations that may have restrictive firearm regulations. In some embodiments, a package-delivery service 166 is a type of service provider 124, and interacts with the logistics system 108 through the service interface 364 similarly as other service-provider devices 360 can.

Additionally, other features, such as an integrated weight sensor (e.g., built into a handle and/or wheel(s) of the suitcase) is used. In some embodiments, a generator integrated with a suitcase wheel or wheels is used to power electronics of the suitcase.

Further, features can be removed or added. For example, in some embodiments of the suitcase 132, the suitcase 132 does not use a dynamic display 412. Instead the suitcase 132 uses traditional mailing labels. In another variation, repositories (e.g., security repository 716 and/or inventory repository 816) are part of the logistics system 108 instead of the suitcase 132.

The above methods may be implemented by computer-program products that direct a computer system to perform the actions of the above-described methods and components. Each such computer-program product may comprise sets of instructions (codes) stored in a memory device. The instructions may be configured to run in sequential order, or in parallel (such as under different processing threads), or in a combination thereof.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

While the principles of the disclosure have been described above in connection with specific apparatuses and methods, it is to be clearly understood that this description is made only by way of example and not as limitation on the scope of the disclosure.

What is claimed is:

1. A logistics system for routing and tracking bags, the logistics system comprising:
   a customer interface receiving, from a customer device running a first instance of an application, instructions to initiate a first set of operations, wherein:
   a first function in the first set of operations is selecting a first set of items of a plurality of items, to populate a first bag, wherein the plurality of items are stored in a storage container at an origin location;
   a second function in the first set of operations is selecting a first location to route the first bag from the origin location;
   a third function in the first set of operations is selecting a processing option for each item in the first set of items of the plurality of items;
   a fourth function in the first set of operations is selecting a second set of items from the plurality of items to populate a second bag, wherein the second set of items from the plurality of items includes one or more items from the first set of items of the plurality of items; and
   a fifth function in the first set of operations is selecting a second location to route the second bag from the origin location; and
   a logistic-system server receiving, from a first device running a second instance of the application, instructions to initiate a second set of operations, wherein:
   a first function in the second set of operations includes sending a first trigger to a logistics engine to populate the first bag with the first set of items of the plurality of items;
   a second function in the second set of operations includes routing the first bag to the first location;
   a third function in the second set of operations includes a first tracking of the first bag to the first location;
   a fourth function in the second set of operations includes transmitting the first tracking information to the logistics engine;

a fifth function in the second set of operations includes transmitting a first message to the logistics engine that the first bag is at the first location;
a sixth function in the second set of operations includes routing the first bag from the first location to the origin location;
a seventh function in the second set of operations includes a second tracking of the first bag to the origin location;
an eighth function in the second set of operations includes transmitting the second tracking information to the logistics engine;
a ninth function in the second set of operations includes transmitting a second message to the logistics engine that the first bag is at the origin location;
a tenth function in the second set of operations includes sending a second trigger to the logistics engine to begin the processing option for each item in the first set of items of the plurality of items to the logistics engine;
an eleventh function in the second set of operations includes sending a third trigger to the logistics engine to populate the second bag with the second set of items of the plurality of items; and
a twelfth function in the second set of operation includes routing the second bag to the second location; and
the logistic engine receiving, from a second device, located at the origin location, running a third instance of the application, instructions to initiate a third set of operations, wherein:
a first function of the third set of operations includes receiving the first trigger to populate the first bag with the first set of items of the plurality of items;
a second function of the third set of operations includes initiating a first process to populate the first bag with the first set of items of the plurality of items;
a third function of the third set of operations includes receiving the first tracking information;
a fourth function of the third set of operations includes triggering a first notification to display the first tracking information on the customer device;
a fifth function of the third set of operations includes receiving the first message that the first bag is at the first location;
a sixth function of the third set of operations includes triggering a second notification to display that the first bag is at the first location, on the customer device;
a seventh function of the third set of operations includes receiving the second tracking information;
an eighth function of the third set of operations includes triggering a third notification to display the second tracking information on the customer device;
a ninth function of the third set of operations includes receiving the second message that the first bag is at the origin location;
a tenth function of the third set of operations includes receiving the second trigger to apply the process option to each item of the first set of items of the plurality of items;
an eleventh function of the third set of operations includes initiating a second process to return each item of the first set of items of the plurality of items to the storage container;
a twelfth function of the third set of operations includes initiating a third process to prepare the first bag for future use; and
a thirteenth function of the third set of operations includes receiving the third trigger to populate the second bag with the second set of items of the plurality of items.

2. The logistics system for routing and tracking bags as recited in claim 1, wherein the first bag and the second bag are the same bag or the first bag and the second bag are different bags.

3. The logistics system for routing and tracking bags as recited in claim 1, wherein the plurality of items are owned by a customer using the customer device.

4. The logistics system for routing and tracking bags as recited in claim 1, wherein the plurality of items are rented from the logistics system by a customer using the customer device.

5. The logistics system for routing and tracking bags as recited in claim 1, wherein the processing option includes, laundering, dry-cleaning, steaming, pressing, or polishing.

6. The logistics system for routing and tracking bags as recited in claim 1, wherein one or more of the plurality of items are purchased from the logistics system by a customer using the customer device.

7. The logistics system for routing and tracking bags as recited in claim 1, wherein the first location is a different location than the second location or the first location is the same as the second location.

8. A method for routing and tracking bags, the method comprising: receiving by a customer interface, from a customer device running a first instance of an application, instructions to initiate a first set of operations, wherein:
a first function in the first set of operations is selecting a first set of items of a plurality of items, to populate a first bag, wherein the plurality of items are stored in a storage container at an origin location;
a second function in the first set of operations is selecting a first location to route the first bag from the origin location;
a third function in the first set of operations is selecting a processing option for each item in the first set of items of the plurality of items;
a fourth function in the first set of operations is selecting a second set of items from the plurality of items to populate a second bag, wherein the second set of items from the plurality of items includes one or more items from the first set of items of the plurality of items; and
a fifth function in the first set of operations is selecting a second location to route the second bag from the origin location; and
receiving by a logistic-system server, from a first device running a second instance of the application, instructions to initiate a second set of operations, wherein:
a first function in the second set of operations includes sending a first trigger to a logistics engine to populate the first bag with the first set of items of the plurality of items;
a second function in the second set of operations includes routing the first bag to the first location;
a third function in the second set of operations includes a first tracking of the first bag to the first location;
a fourth function in the second set of operations includes transmitting the first tracking information to the logistics engine;
a fifth function in the second set of operations includes transmitting a first message to the logistics engine that the first bag is at the first location;
a sixth function in the second set of operations includes routing the first bag from the first location to the origin location;
a seventh function in the second set of operations includes a second tracking of the first bag to the origin location;

an eighth function in the second set of operations includes transmitting the second tracking information to the logistics engine;
a ninth function in the second set of operations includes transmitting a second message to the logistics engine that the first bag is at the origin location;
a tenth function in the second set of operations includes sending a second trigger to the logistics engine to begin the processing option for each item in the first set of items of the plurality of items to the logistics engine;
an eleventh function in the second set of operations includes sending a third trigger to the logistics engine to populate the second bag with the second set of items of the plurality of items; and
a twelfth function in the second set of operation includes routing the second bag to the second location; and
receiving by the logistic engine, from a second device, located at the origin location, running a third instance of the application, instructions to initiate a third set of operations, wherein:
a first function of the third set of operations includes receiving the first trigger to populate the first bag with the first set of items of the plurality of items;
a second function of the third set of operations includes initiating a first process to populate the first bag with the first set of items of the plurality of items;
a third function of the third set of operations includes receiving the first tracking information;
a fourth function of the third set of operations includes triggering a first notification to display the first tracking information on the customer device;
a fifth function of the third set of operations includes receiving the first message that the first bag is at the first location;
a sixth function of the third set of operations includes triggering a second notification to display that the first bag is at the first location, on the customer device;
a seventh function of the third set of operations includes receiving the second tracking information;
an eighth function of the third set of operations includes triggering a third notification to display the second tracking information on the customer device;
a ninth function of the third set of operations includes receiving the second message that the first bag is at the origin location;
a tenth function of the third set of operations includes receiving the second trigger to apply the process option to each item of the first set of items of the plurality of items;
an eleventh function of the third set of operations includes initiating a second process to return each item of the first set of items of the plurality of items to the storage container;
a twelfth function of the third set of operations includes initiating a third process to prepare the first bag for future use; and
a thirteenth function of the third set of operations includes receiving the third trigger to populate the second bag with the second set of items of the plurality of items.

9. The method for routing and tracking bags as recited in claim 8, wherein the first bag and the second bag are the same bag or the first bag and the second bag are different bags.

10. The method for routing and tracking bags as recited in claim 8, wherein the plurality of items are owned by a customer using the customer device.

11. The method for routing and tracking bags as recited in claim 8, wherein the plurality of items are rented from the logistics system by a customer using the customer device.

12. The method for routing and tracking bags as recited in claim 8, wherein the processing option includes, laundering, dry-cleaning, steaming, pressing, or polishing.

13. The method for routing and tracking bags as recited in claim 8, wherein one or more of the plurality of items are purchased from the logistics system by a customer using the customer device.

14. The method for routing and tracking bags as recited in claim 8, wherein the first location is a different location than the second location or the first location is the same as the second location.

15. A non-transitory, computer-readable medium comprising instructions that, when executed by one or more processors, causes the one or more processors to perform operations for routing and tracking bags, the operations comprising:
receiving by a customer interface, from a customer device running a first instance of an application, instructions to initiate a first set of operations, wherein:
a first function in the first set of operations is selecting a first set of items of a plurality of items, to populate a first bag, wherein the plurality of items are stored in a storage container at an origin location:
a second function in the first set of operations is selecting a first location to route the first bag from the origin location;
a third function in the first set of operations is selecting a processing option for each item in the first set of items of the plurality of items; and
a fourth function in the first set of operations is selecting a second set of items from the plurality of items to populate a second bag, wherein the second set of items from the plurality of items includes one or more items from the first set of items of the plurality of items; and
a fifth function in the first set of operations is selecting a second location to route the second bag from the origin location;
receiving by a logistic-system server, from a first device running a second instance of the application, instructions to initiate a second set of operations, wherein:
a first function in the second set of operations includes sending a first trigger to a logistics engine to populate the first bag with the first set of items of the plurality of items:
a second function in the second set of operations includes routing the first bag to the first location;
a third function in the second set of operations includes a first tracking of the first bag to the first location;
a fourth function in the second set of operations includes transmitting the first tracking information to the logistics engine;
a fifth function in the second set of operations includes transmitting a first message to the logistics engine that the first bag is at the first location;
a sixth function in the second set of operations includes routing the first bag from the first location to the origin location;
a seventh function in the second set of operations includes a second tracking of the first bag to the origin location;
an eighth function in the second set of operations includes transmitting the second tracking information to the logistics engine;

a ninth function in the second set of operations includes transmitting a second message to the logistics engine that the first bag is at the origin location;

a tenth function in the second set of operations includes sending a second trigger to the logistics engine to begin the processing option for each item in the first set of items of the plurality of items to the logistics engine;

an eleventh function in the second set of operations includes sending a third trigger to the logistics engine to populate the second bag with the second set of items of the plurality of items; and a twelfth function in the second set of operation includes routing the second bag to the second location; and receiving by the logistic engine, from a second device, located at the origin location, running a third instance of the application, instructions to initiate a third set of operations, wherein:

a first function of the third set of operations includes receiving the first trigger to populate the first bag with the first set of items of the plurality of items, a second function of the third set of operations includes initiating a first process to populate the first bag with the first set of items of the plurality of items;

a third function of the third set of operations includes receiving the first tracking information;

a fourth function of the third set of operations includes triggering a first notification to display the first tracking information on the customer device;

a fifth function of the third set of operations includes receiving the first message that the first bag is at the first location;

a sixth function of the third set of operations includes triggering a second notification to display that the first bag is at the first location, on the customer device;

a seventh function of the third set of operations includes receiving the second tracking information;

an eighth function of the third set of operations includes triggering a third notification to display the second tracking information on the customer device;

a ninth function of the third set of operations includes receiving the second message that the first bag is at the origin location;

a tenth function of the third set of operations includes receiving the second trigger to apply the process option to each item of the first set of items of the plurality of items;

an eleventh function of the third set of operations includes initiating a second process to return each item of the first set of items of the plurality of items to the storage container;

a twelfth function of the third set of operations includes initiating a third process to prepare the first bag for future use; and a thirteenth function of the third set of operations includes receiving the third trigger to populate the second bag with the second set of items of the plurality of items.

16. The non-transitory, computer-readable medium comprising instructions that, when executed by one or more processors, causes the one or more processors to perform operations for routing and tracking bags as recited in claim 15, wherein the first bag and the second bag are the same bag or the first bag and the second bag are different bags.

17. The non-transitory, computer-readable medium comprising instructions that, when executed by one or more processors, causes the one or more processors to perform operations for routing and tracking bags as recited in claim 15, wherein the plurality of items are owned by a customer using the customer device.

18. The non-transitory, computer-readable medium comprising instructions that, when executed by one or more processors, causes the one or more processors to perform operations for routing and tracking bags as recited in claim 15, wherein the plurality of items are rented from the logistics system by a customer using the customer device.

19. The non-transitory, computer-readable medium comprising instructions that, when executed by one or more processors, causes the one or more processors to perform operations for routing and tracking bags as recited in claim 15, wherein the processing option includes, laundering, dry-cleaning, steaming, pressing, or polishing.

20. The non-transitory, computer-readable medium comprising instructions that, when executed by one or more processors, causes the one or more processors to perform operations for routing and tracking bags as recited in claim 15, wherein one or more of the plurality of items are purchased from the logistics system by a customer using the customer device.

* * * * *